(12) United States Patent
Welna et al.

(10) Patent No.: US 10,907,774 B2
(45) Date of Patent: Feb. 2, 2021

(54) LIGHT SOURCE UNIT

(71) Applicant: Sharp Kabushiki Kaisha, Osaka (JP)

(72) Inventors: Karl Peter Welna, Oxford (GB);
Mattia Signoretto, Oxford (GB);
Valerie Berryman-Bousquet, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 16/688,044

(22) Filed: Nov. 19, 2019

(65) Prior Publication Data

US 2020/0191342 A1 Jun. 18, 2020

Related U.S. Application Data

(60) Provisional application No. 62/772,196, filed on Nov. 28, 2018.

(51) Int. Cl.
| | | |
|---|---|---|
| *F21K 9/64* | (2016.01) | |
| *G02B 27/30* | (2006.01) | |
| *G02B 5/02* | (2006.01) | |
| *F21V 9/35* | (2018.01) | |
| *F21Y 115/30* | (2016.01) | |

(52) U.S. Cl.
CPC .............. *F21K 9/64* (2016.08); *F21V 9/35* (2018.02); *G02B 5/0294* (2013.01); *G02B 27/30* (2013.01); *F21Y 2115/30* (2016.08)

(58) Field of Classification Search
CPC .......... F21K 9/64; F21K 9/35; G02B 5/0294; G02B 27/30

USPC ........................................................ 362/293
See application file for complete search history.

(56) References Cited

U.S. PATENT DOCUMENTS

| | | | | |
|---|---|---|---|---|
| 7,651,243 | B2* | 1/2010 | McGuire, Jr. | F21S 10/007 362/293 |
| 2010/0259918 | A1* | 10/2010 | Rains, Jr. | F21K 9/64 362/84 |
| 2010/0295438 | A1* | 11/2010 | Ott | F21K 9/64 313/46 |
| 2012/0201030 | A1* | 8/2012 | Yuan | H04N 9/3114 362/293 |
| 2013/0010492 | A1* | 1/2013 | Montgomery | F21S 41/321 362/553 |
| 2013/0027962 | A1* | 1/2013 | Takahashi | F21V 5/004 362/538 |
| 2013/0271947 | A1* | 10/2013 | Finsterbusch | F21V 21/14 362/19 |

(Continued)

FOREIGN PATENT DOCUMENTS

WO WO 2018/001813 1/2018

*Primary Examiner* — Bryon T Gyllstrom
(74) *Attorney, Agent, or Firm* — Renner, Otto, Boisselle & Sklar, LLP

(57) ABSTRACT

[Object] Collection efficiency of a reflector that reflects a converted beam, which is converted from a pump beam by a phosphor, and projects the resultant as a projection beam is increased.
[Solution] An optical member (4) of a light source unit (1) deflects a pump beam (PB) so that a first angle of incidence (α1) of a pump beam (PBX) relative to a surface of a phosphor (3) is larger than a second angle of incidence (α2) of the pump beam (PB), which is incident on the optical member (4), relative to the surface of the phosphor (3).

20 Claims, 19 Drawing Sheets

(56) References Cited

U.S. PATENT DOCUMENTS

| | | | |
|---|---|---|---|
| 2013/0279151 A1* | 10/2013 | Ouderkirk | H01L 33/60 |
| | | | 362/84 |
| 2013/0308332 A1* | 11/2013 | Woelfing | G03B 21/204 |
| | | | 362/553 |
| 2014/0022512 A1* | 1/2014 | Li | G03B 21/14 |
| | | | 353/31 |
| 2014/0049965 A1* | 2/2014 | Aanegola | H01L 33/502 |
| | | | 362/259 |
| 2015/0167905 A1* | 6/2015 | Khrushchev | F21V 13/08 |
| | | | 362/84 |
| 2018/0216811 A1* | 8/2018 | Fukakusa | H01S 5/02292 |

* cited by examiner

FIG. 4
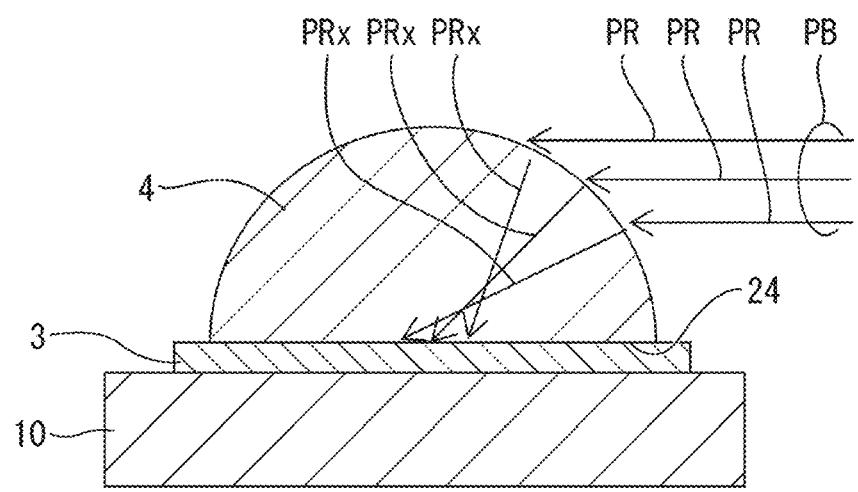
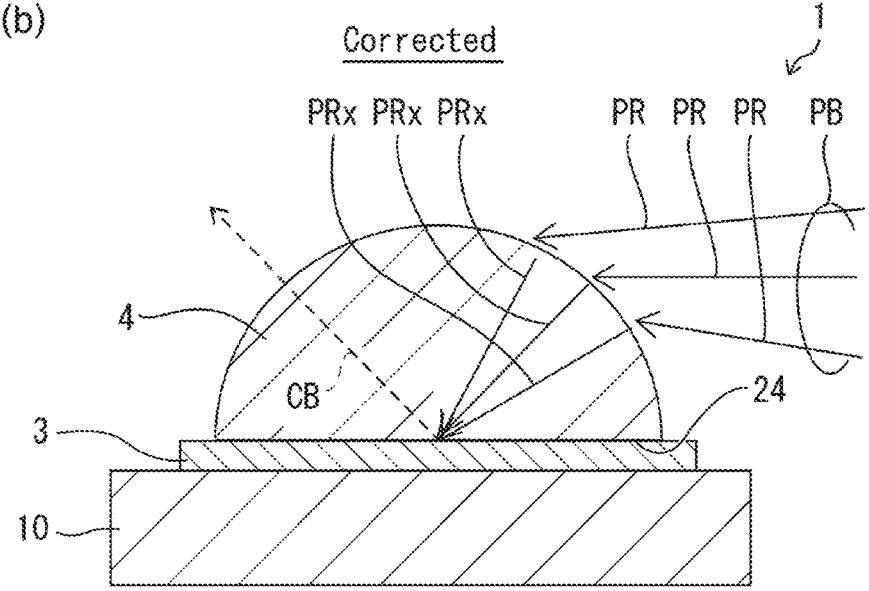

FIG. 7
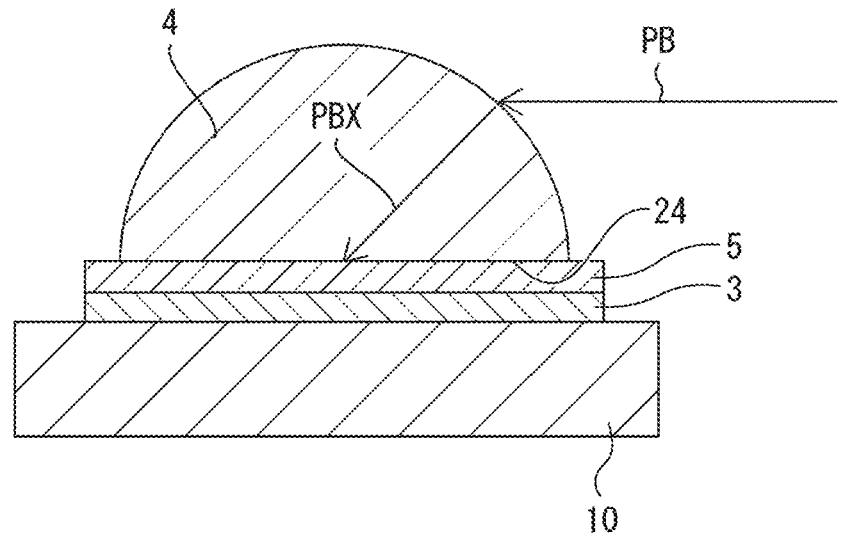
(a)
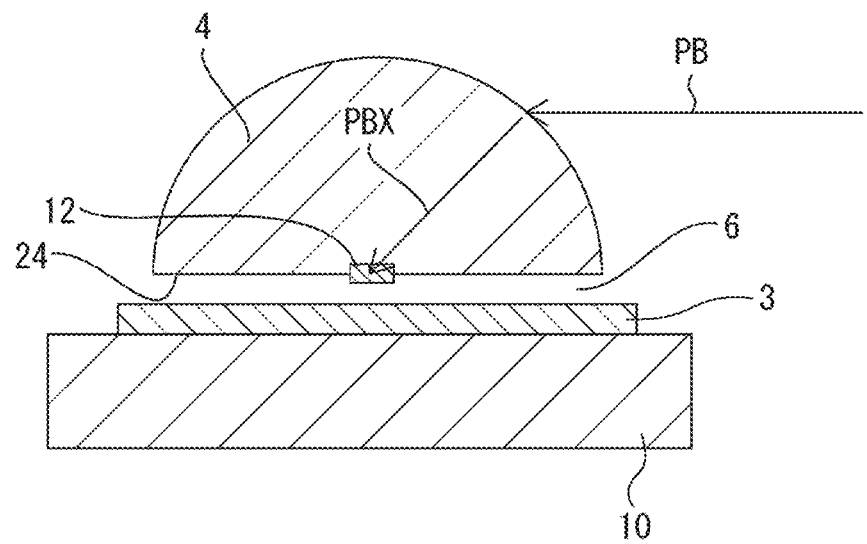
(b)

FIG. 9
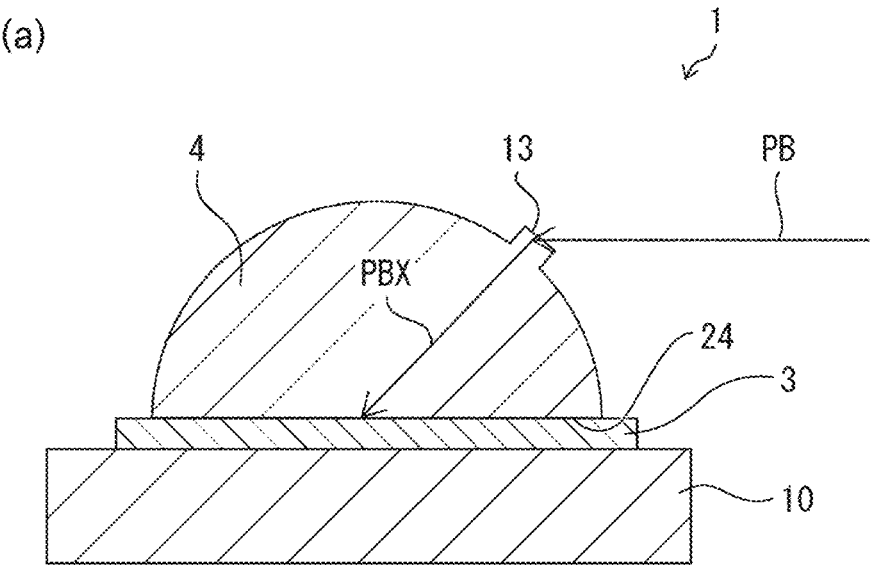
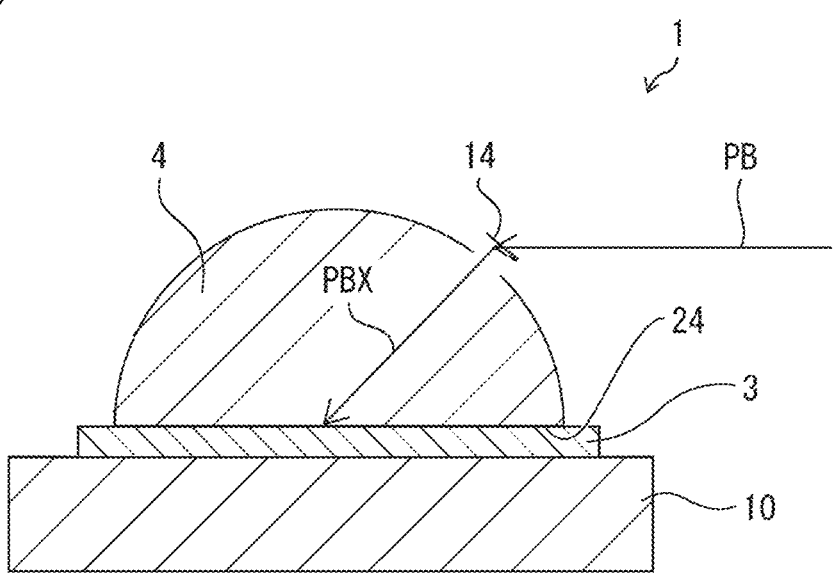

FIG. 15
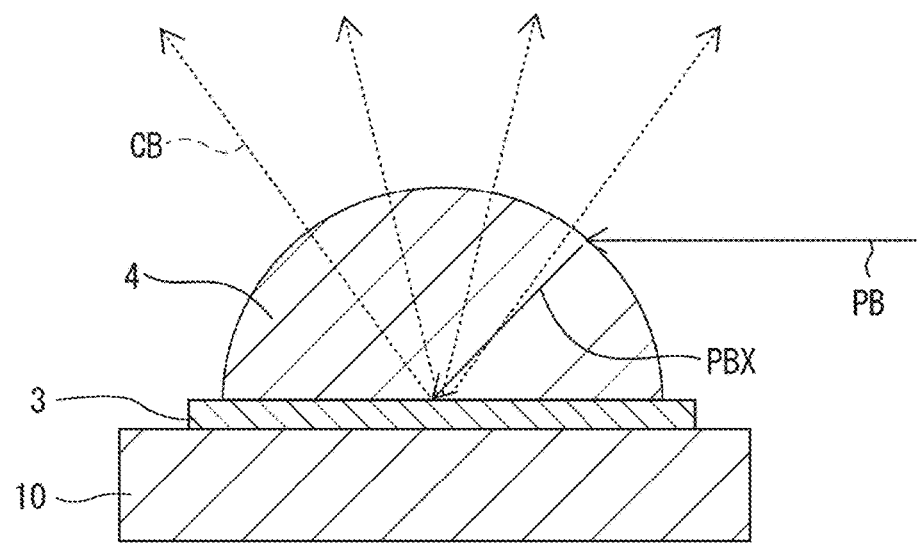
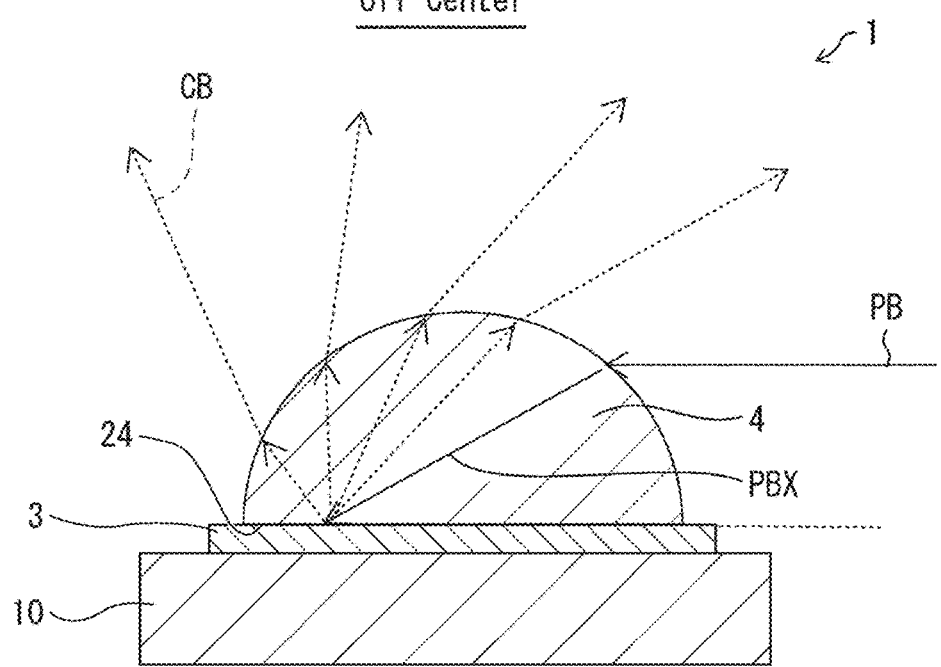

α > 30°

US 10,907,774 B2

LIGHT SOURCE UNIT

TECHNICAL FIELD

The present invention relates to a light source unit including a light source that emits a pump beam, a phosphor that converts the pump beam, which is emitted from the light source, into a converted beam, and an optical member that causes the pump beam, which is emitted from the light source, to be incident on the phosphor.

BACKGROUND ART

A light source unit including an optical member bonded to a phosphor that converts a pump beam, which is produced from a laser light source, into a converted beam is known (PTL 1). The pump beam produced from the laser light source passes through the optical member and hits the phosphor. The pump beam from the laser light source is vertically incident on a surface of the optical member. Thus, an angle in a traveling direction of the pump beam passing through the surface of the optical member does not change and is the same as an angle in a traveling direction of the pump beam before being incident on the optical member. Moreover, an angle between the pump beam before being incident on the optical member and the surface of the phosphor is non-zero due to a characteristic of a reflective phosphor configuration such as a phosphor layer on a reflective substrate, for example.

CITATION LIST

Patent Literature

[PTL 1] PCT International Application Publication No. WO2018/001813 (published on Jan. 4, 2018)

SUMMARY OF INVENTION

Technical Problem

FIG. 20 is a sectional view of a conventional light source unit. In a conventional configuration of a phosphor 3 that is mounted on a substrate 10 and converts a pump beam PB into a converted beam CB, as illustrated in FIG. 20, there is usually a tilt angle α between the pump beam PB and a reference plane S1 of a surface of the phosphor 3.

FIG. 21 is a sectional view of another conventional light source unit. Generally, in an application that is illustrated in FIG. 21 and requires use of a reflector 8 to reflect and project the converted beam CB, the tilt angle α causes problems related to difficulty in usability in terms of restriction for reflector design and to maximum collection efficiency of the converted beam CB. In fact, in this configuration, the tilt angle α is difficult to be made smaller than 30 degrees. This is because, when the tilt angle α is made smaller than 30 degrees, a problem is caused that a spot shape of the pump beam PB, which is incident in a tilted manner, on the phosphor 3 is stretched in an optical axis direction of the pump beam PB and thus a spot with a desirable shape is difficult to be obtained.

However, to increase collection efficiency of the reflector 8 and therefore to increase overall efficiency of the light source unit, it is beneficial to use the tilt angle α smaller than 30 degrees in terms of increase of freedom in design of the reflector 8 and optimization of overall design.

An aspect of the invention aims to achieve a light source unit suitable for obtaining a converted beam that is converted from a pump beam by a phosphor.

Solution to Problem (1) An embodiment of the invention provides a light source unit including: a light source that emits a pump beam; a phosphor that converts the pump beam, which is emitted from the light source, into a converted beam; and an optical member that is arranged near the phosphor to deflect the pump beam, in which the optical member deflects the pump beam so that a first angle of incidence of the pump beam, which is deflected by the optical member, relative to a surface of the phosphor is larger than a second angle of incidence of the pump beam, which is incident on the optical member, relative to the surface of the phosphor, and the optical member has a counterface surface that faces the phosphor so as to cover the surface of the phosphor.

(2) Moreover, an embodiment of the invention provides the light source unit in which the second angle of incidence is equal to or less than 40 degrees, in addition to the configuration of (1) described above.

(3) Moreover, an embodiment of the invention provides the light source unit in which the pump beam deflected at an incident surface of the optical member travels in the optical member and is incident on the phosphor, in addition to the configuration of (1) described above.

(4) Moreover, an embodiment of the invention provides the light source unit in which the optical member refracts or diffracts the pump beam to deflect the pump beam toward a side of the phosphor in a traveling direction, in addition to the configuration of (1) described above.

(5) Moreover, an embodiment of the invention provides the light source unit in which the optical member is bonded to the phosphor, an intermediate layer is arranged between the optical member and the phosphor, or an air gap is formed between the optical member and the phosphor, in addition to the configuration of (1) described above.

(6) Moreover, an embodiment of the invention provides the light source unit in which an anti-reflective coating is formed on the optical member, in addition to the configuration of (1) described above.

(7) Moreover, an embodiment of the invention provides the light source unit further including a reflector that projects a projection beam obtained by collimating the converted beam from the phosphor, in which a direction in which the pump beam is incident on the optical member and a direction in which the projection beam is projected are identical, opposite, or orthogonal directions, in addition to the configuration of (1) described above.

(8) Moreover, an embodiment of the invention provides the light source unit in which the pump beam includes a plurality of different pump rays, and a traveling direction correction member that corrects traveling directions of the plurality of different pump rays so that the plurality of different pump rays are incident to converge onto an identical point on the phosphor is further provided, in addition to the configuration of (1) described above.

(9) An embodiment of the invention provides a light source unit including: a light source that emits a pump beam; a phosphor that is mounted on a substrate to convert the pump beam, which is emitted from the light source, into a converted beam; and an optical member that is arranged at a position corresponding to the phosphor to deflect the pump beam at an incident surface on which the pump beam is incident, in which the optical member deflects the pump beam so that a first angle of incidence of the pump beam, which is deflected by the optical member, relative to a surface of the phosphor is larger than a second angle of incidence of the pump beam, which is incident on the optical member, relative to the surface of the phosphor, the phosphor is arranged on a side of one edge of the optical member, the converted beam converted by the phosphor is reflected by an inner surface of the optical member and re-imaged on a side of another edge of the optical member, and the converted beam that is re-imaged on the side of the other edge of the optical member is emitted.

(10) Moreover, an embodiment of the invention provides the light source unit in which the second angle of incidence is equal to or less than 40 degrees, in addition to the configuration of (9) described above.

(11) Moreover, an embodiment of the invention provides the light source unit in which the pump beam deflected at the incident surface of the optical member travels in the optical member and is incident on the phosphor, in addition to the configuration of (9) described above.

(12) Moreover, an embodiment of the invention provides the light source unit in which the optical member refracts or diffracts the pump beam and deflects the pump beam toward a side of the phosphor in a traveling direction, in addition to the configuration of (9) described above.

(13) Moreover, an embodiment of the invention provides the light source unit in which the optical member is bonded to the phosphor, an intermediate layer is arranged between the optical member and the phosphor, or an air gap is formed between the optical member and the phosphor, in addition to the configuration of (9) described above.

(14) Moreover, an embodiment of the invention provides the light source unit in which an anti-reflective coating is formed on the optical member, in addition to the configuration of (9) described above.

(15) Moreover, an embodiment of the invention provides the light source unit further including a reflector that projects a projection beam obtained by collimating the converted beam that is emitted through an emission hole formed in the substrate, in which a direction in which the pump beam is incident on the optical member and a direction in which the projection beam is projected are identical, opposite, or orthogonal directions, in addition to the configuration of (9) described above.

(16) Moreover, an embodiment of the invention provides the light source unit in which the optical member has an extraction portion arranged on the side of the other edge of the optical member to improve extraction efficiency of the converted beam, in addition to the configuration of (9) described above.

(17) Moreover, an embodiment of the invention provides the light source unit further including a reflector that projects a projection beam obtained by collimating the converted beam that is emitted through an emission hole formed in the substrate, in addition to the configuration of (9) described above.

(18) Moreover, an embodiment of the invention provides the light source unit in which a size ratio of a converted spot on the side of the one edge of the optical member, at which the pump beam is converted into the converted beam by the phosphor, to a re-imaged spot on the side of the other edge of the optical member, at which the converted beam is re-imaged, is decided in accordance with a shape of the optical member, in addition to the configuration of (9) described above.

Advantageous Effects of Invention

According to an aspect of the invention, it is possible to achieve a light source unit suitable for obtaining a converted beam that is converted from a pump beam by a phosphor.

BRIEF DESCRIPTION OF DRAWINGS

FIG. 4 is a drawing illustrating two sectional views, whereby (a) is a sectional view illustrating a form in which a pump beam from the light source unit is incident on an optical member and (b) is a sectional view illustrating another form in which the pump beam is incident on the optical member.

FIG. 7 is a drawing illustrating two sectional views, including views (a) and (b) that are sectional views each illustrating a modified example according to a structure between the optical member and a phosphor of the light source unit.

FIG. 9 is a drawing illustrating two sectional views, including views (a) and (b) that are sectional views each illustrating a modified example according to a structure of the optical member of the light source unit.

FIG. 15 is a drawing illustrating two sectional views, including views (a) and (b) that are sectional views for explaining a light source unit according to Example 2.

DESCRIPTION OF EMBODIMENTS

Embodiments of the invention will be described in detail below.

Embodiment 1

Figure 1:
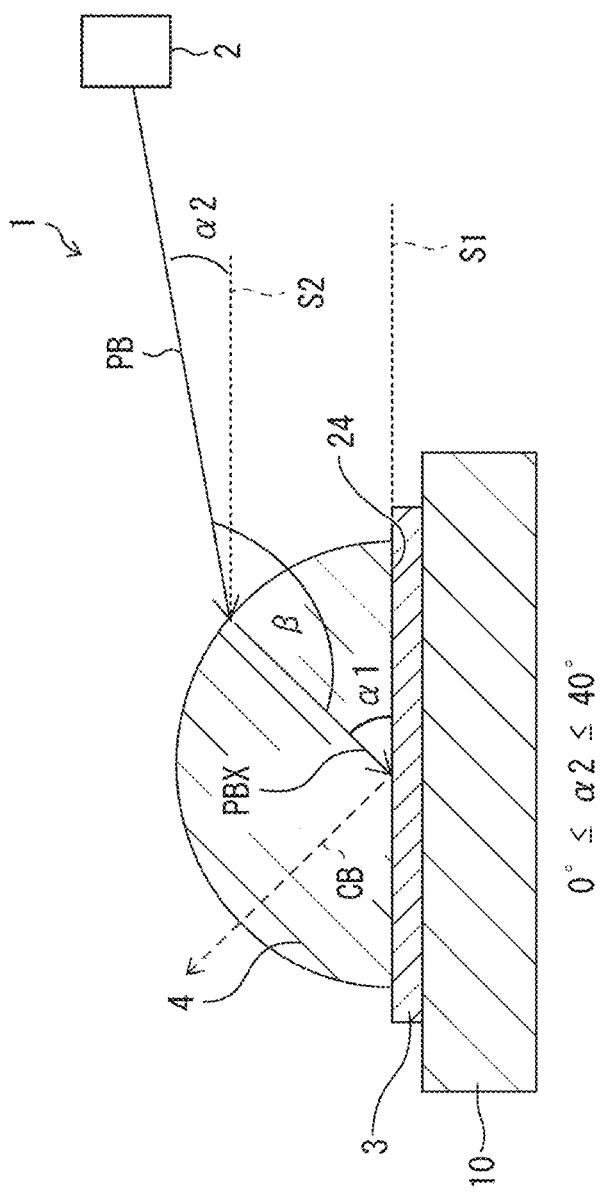
FIG. 1 is a sectional view of a light source unit according to Embodiment 1.

FIG. 1 is a sectional view of a light source unit 1 according to Embodiment 1. The light source unit 1 includes a beam producing unit 2 (light source) that emits a pump beam PB, a phosphor 3 that converts the pump beam PB, which is emitted from the beam producing unit 2, into a converted beam CB, and an optical member 4 that is mounted on the phosphor 3 and deflects the pump beam PB at an incident surface on which the pump beam PB is incident. The optical member 4 deflects the pump beam PB so that a first angle of incidence $\alpha 1$ of a pump beam PBX, which is deflected from the pump beam PB by the optical member 4, relative to a surface of the phosphor 3 is larger than a second angle of incidence $\alpha 2$ of the pump beam PB, which is incident on the optical member 4, relative to the surface of the phosphor 3. The optical member 4 has a counterface surface 24 that faces the phosphor 3 so as to cover the surface of the phosphor 3.

The phosphor 3 is mounted on the substrate 10. The optical member 4 has a hemispherical shape and is bonded onto the phosphor 3.

The second angle of incidence $\alpha 2$ is equal to or less than 40 degrees. The pump beam PBX deflected at the incident surface of the optical member 4 travels in the optical member 4 and is incident on the phosphor 3. An angle $\beta$ between the pump beam PB before being incident on the optical member 4 and the pump beam PBX after being deflected by the optical member 4 is smaller than 180 degrees. The optical member 4 refracts or diffracts the pump beam PB to deflect the pump beam PB toward a phosphor 3 side in a traveling direction.

The pump beam PB emitted from the beam producing unit 2 is incident on a hemispherical outer peripheral surface of the optical member 4 at the second angle of incidence $\alpha 2$. The pump beam PB incident on the optical member 4 at the second angle of incidence $\alpha 2$ is deflected toward the phosphor 3 side in the traveling direction by refraction or diffraction and is incident, as the pump beam PBX, on the surface of the phosphor 3, which corresponds to a center of a bottom face of the optical member 4, at the first angle of incidence $\alpha 1$ greater than the second angle of incidence $\alpha 2$. Then, the pump beam PBX incident on the phosphor 3 at the first angle of incidence $\alpha 1$ has a wavelength converted by the phosphor 3 and is emitted as the converted beam CB from the phosphor 3 through the optical member 4.

The first angle of incidence $\alpha 1$ is an angle between a reference plane S1, which corresponds to the surface of the phosphor 3, and the pump beam PBX, and the second angle of incidence $\alpha 2$ is an angle between a reference plane S2, which is parallel to the surface of the phosphor 3, and the pump beam PB.

The embodiment illustrated in FIG. 1 realizes incidence of the pump beam PB at a small tilt angle (angle $\alpha 2$ between the pump beam PB and the surface of the phosphor 3), which is difficult to be realized by a conventional configuration of a reflective type, in which a phosphor is excited, and solves a problem by using the optical member 4 that is arranged on the surface of the phosphor 3 and deflects the pump beam PB toward the phosphor 3. Further, the pump beam PB is incident on the optical member 4 at an angle of non-zero relative to a normal line of a hemispherical surface of the optical member, and thus changes the traveling direction by the angle $\beta<180$ degrees. The change in the traveling direction is caused by refraction or diffraction on the outer peripheral surface of the optical member 4.

According to the optical member bonded to the phosphor in PTL 1, since the angle $\beta=180$ degrees is provided, the pump beam does not change the traveling direction when passing through the optical member.

Figure 16:
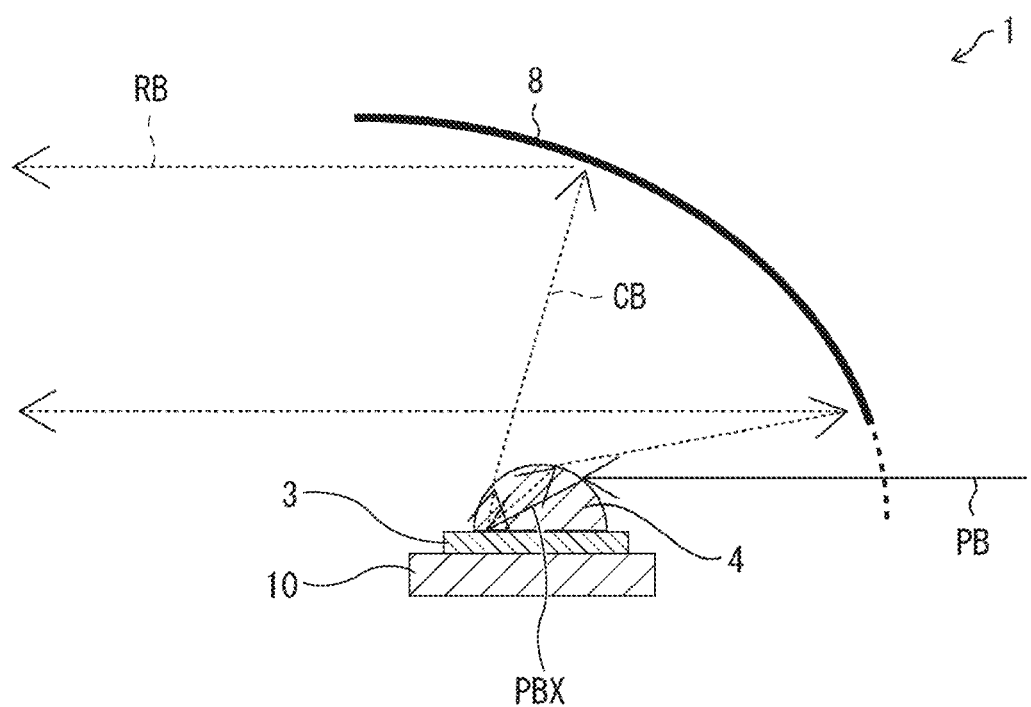
FIG. 16 is a schematic view of the light source unit.

In a case where the present embodiment is used with a reflector that projects the converted beam CB to outside, for example, as illustrated in FIG. 16 described below as the reflector 8, use efficiency of light between the phosphor and the reflector is improved. Thus, a projected flux output is increased compared to a conventional reflective phosphor configuration.

Figure 2:
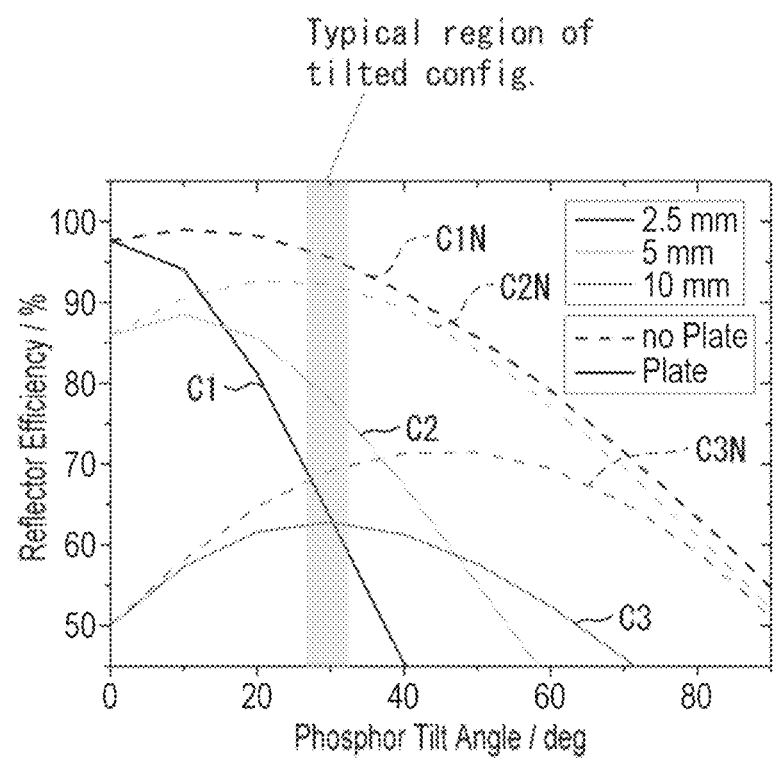
FIG. 2 is a graph illustrating a relationship between a phosphor tilt angle according to the light source unit and reflector efficiency.

FIG. 2 is a graph illustrating a relationship between a phosphor tile angle according to the light source unit 1 and use efficiency (reflector efficiency) of light at a reflector provided outside the light source unit 1. Assumed here is a case where the light source unit 1 and the reflector 8 which is a parabola mirror having a semicircular opening so as to cover the light source unit 1 are provided, as illustrated in FIG. 16 described later. In FIG. 2, a horizontal axis indicates an angle $\alpha$(that is, a tilt of the light source unit 1. Note that, since the phosphor 3 of the light source unit 1 is not tilted in FIG. 16, a configuration of FIG. 16 corresponds to a case where a value of the horizontal axis in FIG. 2 is zero) between an optical axis (that is, a direction in which a projection beam RB is emitted in FIG. 16) of the reflector 8 and the phosphor 3, and use efficiency of light in three types of (standard) parabolic reflectors with different focal lengths (2.5 mm, 5.0 mm, and 10 mm) is calculated and plotted.

Figure 21:
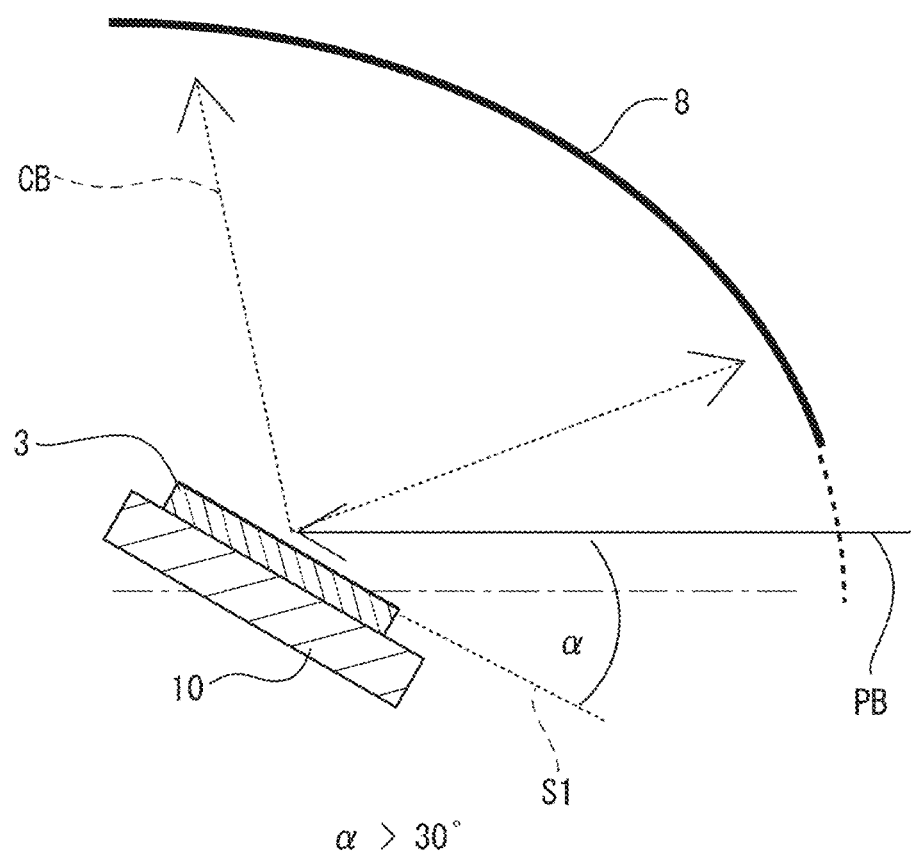
FIG. 21 is a sectional view of another conventional light source unit.

Note that, a case where the angle $\alpha$ of the horizontal axis in FIG. 2 is non-zero ($\alpha>0$) means a state where the light source unit 1 is tilted relative to the optical axis of the reflector 8, for example, means a state as illustrated in FIG. 21. When the light source unit 1 is tilted relative to the optical axis of the reflector 8 ($\alpha>0$), the light source unit 1 itself casts a shadow on the projection beam RB.

Curved lines C1, C2, and C3 depicted by solid lines indicate simulation results obtained while taking into account an effect of the shadow due to the tilt angle $\alpha$, whereas curved lines C1N, C2N, and C3N depicted by dotted lines assume a non-realistic idealized case assuming that the shadow is not cast (assuming that the light source unit 1 is transparent).

The curved line C1 by the solid line indicates a simulation result between the tilt angle $\alpha$ and the reflector efficiency, which is obtained by using the reflector with the focal length of 2.5 mm while taking into account a physical shadow on the phosphor 3. The curved line C1N by the dotted line indicates a simulation result in a non-realistic idealized case, which is obtained while not taking into account a physical shadow on the phosphor. The curved line C2 by the solid line indicates a simulation result between the tilt angle $\alpha$ and the reflector efficiency, which is obtained by using the reflector with the focal length of 5.0 mm while taking into account a physical shadow on the phosphor 3. The curved line C2N by the dotted line indicates a simulation result in a non-realistic idealized case, which is obtained while not taking into account a physical shadow on the phosphor. The curved line C3 by the solid line indicates a simulation result between the tilt angle α and the reflector efficiency, which is obtained by using the reflector with the focal length of 10 mm while taking into account a physical shadow on the phosphor 3. The curved line C3N by the dotted line indicates a simulation result in a non-realistic idealized case, which is obtained while not taking into account a physical shadow on the phosphor.

According to a conventional configuration, when an entirely most compact configuration in which the pump beam PB is made incident on the optical member 4 along the same direction as the optical axis (that is, a direction in which the projection beam RB is projected) of the reflector 8, for example, as illustrated in FIG. 21 is considered, the phosphor 3 needs to be tilted by 30 degrees or more (α>30°). This is because a case where the pump beam PB is specularly reflected by the surface of the phosphor 3 is suppressed to efficiently excite the phosphor 3. However, from the graph, it can be seen that it is beneficial to operate at the tilt angle α less than 30° in terms of rise of the reflector efficiency.

According to the configuration of the present embodiment, even though the pump beam PB is being made incident on the optical member 4 in parallel to the optical axis (direction of the projection beam RB) of the reflector 8, without tilting the light source unit 1 relative to the optical axis of the reflector 8 (or by reducing the tilt angle α), the pump beam (that is, the pump beam PBX) is able to be made incident with an angle relative to the phosphor 3, so that it is possible to project the converted beam CB, which is produced from the phosphor 3, by the reflector 8 with high use efficiency while efficiently exciting the phosphor 3. As a result, it is possible to achieve entire compactness of the light source unit and to obtain an effect of enhancing efficiency thereof.

Figure 3:
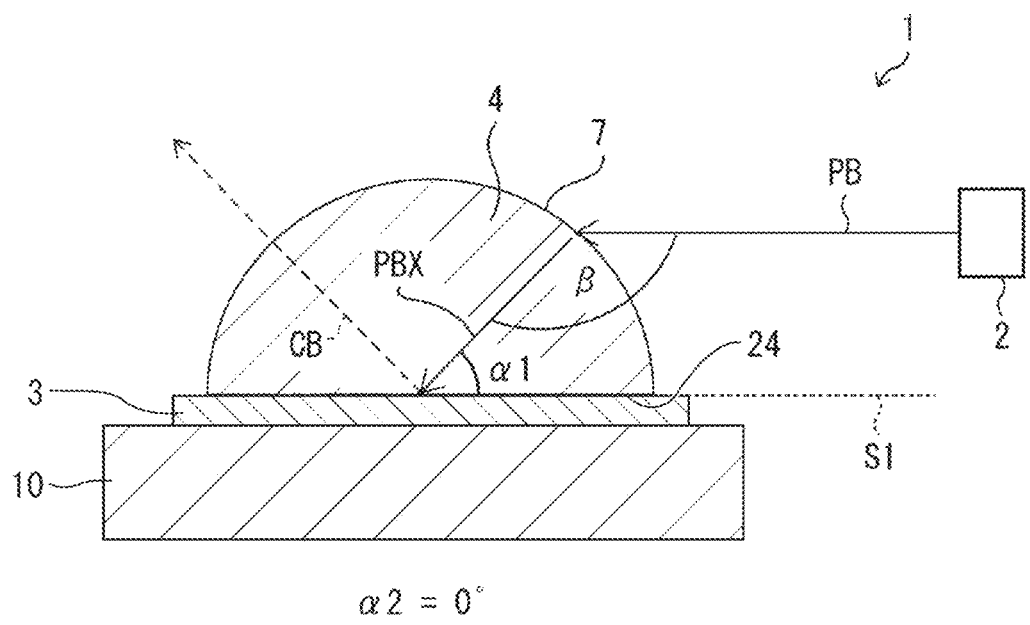
FIG. 3 is a sectional view illustrating a modified example of the light source unit.

FIG. 3 is a sectional view illustrating a modified example of the light source unit 1. Note that, for convenience of description, a member having the same function as that of the member described in the aforementioned embodiment will be given the same reference sign and description thereof will not be repeated.

The pump beam PB is incident on the optical member 4 at the second angle of incidence α2=zero degrees, that is, in parallel to the surface of the phosphor 3. The optical member 4 deflects the incident pump beam PB preferably toward a center of the surface of the phosphor 3. The pump beam PB changes the traveling direction while passing through an interface between the air and the optical member 4 and travels in the optical member 4 as the pump beam PBX. The pump beam PB can be refracted or diffracted at the outer peripheral surface of the optical member 4.

When the pump beam PB is refracted at the outer peripheral surface of the optical member 4, the angle of the traveling direction changes. Therefore, a position on the phosphor 3, on which the pump beam PBX is incident, is modified by changing a shape (angle of incidence of the pump beam PB on the optical member 4) of the optical member 4 and a position on the optical member 4, on which the pump beam PB is incident, and/or by changing a material (refractive index) of the optical member 4.

Various kinds of optical glass are used for the optical member 4, and crown glass, flint glass, and the like such as BK7 and LAH79 are used. Ideally, the refractive index for the pump beam PB (whose angle in the traveling direction changes more largely) and the Abbe number (of low chromatic aberration) need to be high. Other optical materials such as sapphire may be used for the optical member 4. An anti-reflective coating 7 such as a multilayer anti-reflection coating may be formed on the outer peripheral surface of the optical member 4.

Figure 5:
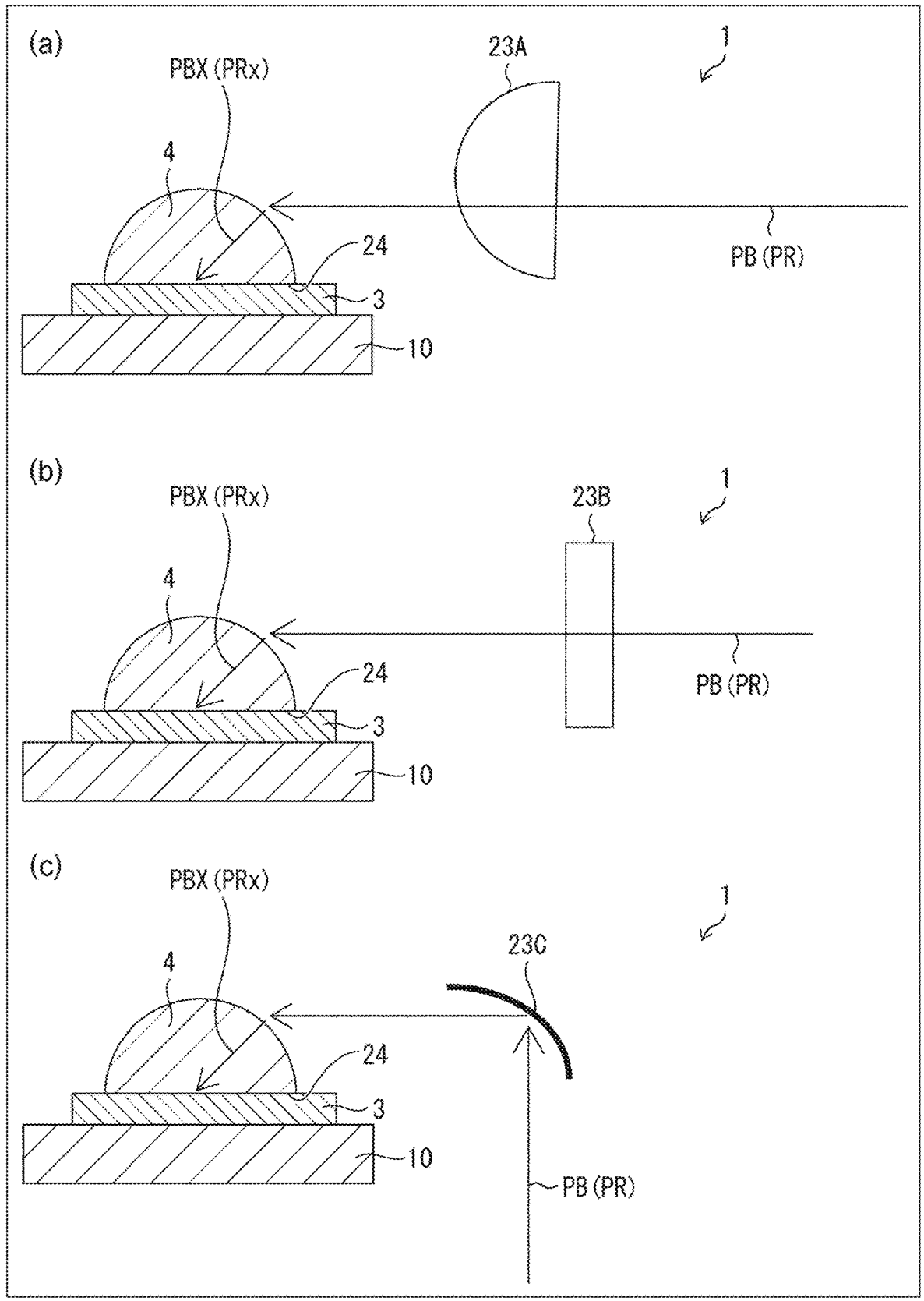
FIG. 5 is a drawing illustrating three sectional views, including views (a), (b), and (c) that are sectional views each illustrating a modified example according to the optical member of the light source unit.

FIG. 4(*a*) is a sectional view illustrating a form in which the pump beam PB is incident on the optical member 4 and FIG. 4(*b*) is a sectional view illustrating another form in which the pump beam PB is incident on the optical member 4. FIGS. 5(*a*), (*b*), and (*c*) are sectional views each illustrating a modified example according to the optical member of the light source unit 1. For convenience of description, a member having the same function as that of the member described in the aforementioned embodiment will be given the same reference sign and description thereof will not be repeated.

The pump beam PB includes a plurality of different pump rays PR. The pump beam PB typically has a finite beam size and is composed of a plurality of different pump rays PR. The plurality of pump rays PR are incident on the optical member 4. The plurality of different pump rays PR of the pump beam PB hit different curvatures on the outer peripheral surface of the optical member 4 as illustrated in FIG. 4(*a*) and therefore result in a plurality of pump rays PRx having different angles of incidence. In a case illustrated in FIG. 4(*a*), the plurality of different pump rays PRx do not overlap at the surface of the phosphor 3.

As illustrated in FIGS. 5(*a*), (*b*), and (*c*), correction members 23A, 23B, and 23C (traveling direction correction members) to make the plurality of different pump rays PRx overlap at the surface of the phosphor 3 are able to be used. The correction members 23A, 23B, and 23C have a function to correct angles of the plurality of different pump rays PR in the traveling direction so that, when the plurality of different pump rays PR are incident on the outer peripheral surface of the optical member 4, the different pump rays PRx converge onto the same point on the phosphor 3.

The correction members 23A, 23B, and 23C can be a transmissive optical member, a reflective optical member, or a transmissive or reflective optical member integrated into the optical member, each of which is able to be used additionally.

For example, as illustrated in FIG. 5(*a*), the correction member 23A composed of a lens having a convex surface can be used with a lateral offset. The correction member 23A may be a lens having a concave surface. The pump beam PB including the plurality of different pump rays PR is incident on the optical member 4 through the correction member 23A. The plurality of different pump rays PR incident on the optical member 4 through the correction member 23A hit different curvatures of the outer peripheral surface of the optical member 4, are refracted or diffracted, result in the plurality of different pump rays PRx, and converge onto the same point on the phosphor 3, as illustrated in FIG. 4(*b*).

As illustrated in FIG. 5(*b*), the correction member 23B composed of a pump beam homogenizing element such as a microlens array is able to be used. The homogenizing element may have tilted surfaces or tilted lenses. The pump beam PB including the plurality of different pump rays PR is incident on the optical member 4 through the correction member 23B. The plurality of different pump rays PR incident on the optical member 4 through the correction member 23B hit different curvatures of the outer peripheral surface of the optical member 4, are refracted or diffracted, result in the plurality of different pump rays PRx, and converge onto the same point on the phosphor 3, as illustrated in FIG. 4(b).

Moreover, as illustrated in FIG. 5(c), the correction member 23C composed of a mirror of a concave surface shape may be used so that the pump beam PB before being incident on the optical member 4 is deflected toward the optical member 4. A shape of the mirror corrects the pump beam PB. The pump beam PB including the plurality of different pump rays PR is reflected by the correction member 23C and incident on the optical member 4. The plurality of different pump rays PR reflected by the correction member 23C and incident on the optical member 4 hit different curvatures of the outer peripheral surface of the optical member 4, are refracted or diffracted, result in the plurality of different pump rays PRx, and converge onto the same point on the phosphor 3, as illustrated in FIG. 4(b).

Figure 6:
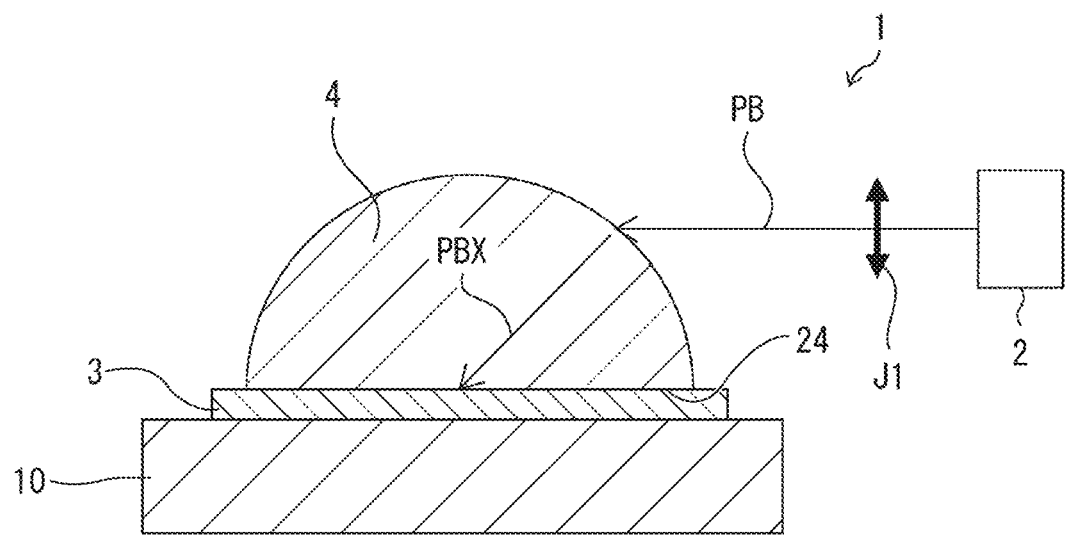
FIG. 6 is a sectional view illustrating a modified example according to a deflecting direction of a laser diode of the light source unit.

FIG. 6 is a sectional view illustrating a modified example according to a deflecting direction of a laser diode of the light source unit 1. The laser diode (LD) of the beam producing unit 2 needs to be aligned so that TE (Transverse Electric) deflected light of the laser diode is in a refraction plane. A Brewster angle can be used to minimize reflection loss at the interface between the air and the outer peripheral surface of the optical member 4. Preferably, a short axis (slow axis) J1 of p-polarized light of the laser diode is aligned along a direction vertical to the surface of the phosphor 3.

FIGS. 7(a) and (b) are sectional views each illustrating a modified example according to a structure between the optical member 4 and the phosphor 3 of the light source unit 1. A conversion material of the phosphor 3 can be YAG:Ce among materials that convert the pump beam PB having a shorter wavelength into the converted beam CB having a longer wavelength. As illustrated in FIG. 7(b), there could be an air gap 6 between a bottom face of the optical member 4 and the surface of the phosphor 3.

The optical member 4 can be directly bonded to the phosphor 3. As illustrated in FIG. 7(a), an intermediate layer 5 can be arranged between the bottom face of the optical member 4 and the surface of the phosphor 3.

In a case where the air gap 6 is formed, an out coupling portion 12 is added to the optical member 4 to increase coupling efficiency between the pump beam PB and the converted beam CB. The out coupling portion 12 has a structure in which a tilt angle of the bottom face of the optical member 4 is controlled or a structure, such as diffraction grating or a rough surface, based on refraction, diffraction, or scattering.

The intermediate layer 5 provided between the phosphor 3 and the optical member 4 preferably has a refractive index larger than that of the phosphor 3 but smaller than that of the optical member 4. The intermediate layer 5 is not allowed to absorb any visible light. A material, such as a Spin-On glass compound, which results in a silica type layer is able to be used for the intermediate layer 5. A sol-gel process is able to be used for forming the intermediate layer 5.

The optical member 4 may be directly bonded to the phosphor 3 or bonded to the intermediate layer 5 via covalent bonding or adhesive bonding, and Spin-On glass is able to be used also for the intermediate layer 5.

FIGS. 8(a) to (h) are sectional views illustrating modified examples according to shapes of optical members 4A to 4H of the light source unit. The optical members 4A to 4H can be made of various different shapes including hemispherical, parabolic, free-form curved, symmetric, asymmetric shapes. The optical members 4A to 4H can be made of a single material such as BK7, LAH79, or sapphire, or a plurality of materials as a combination thereof.

Figure 8:
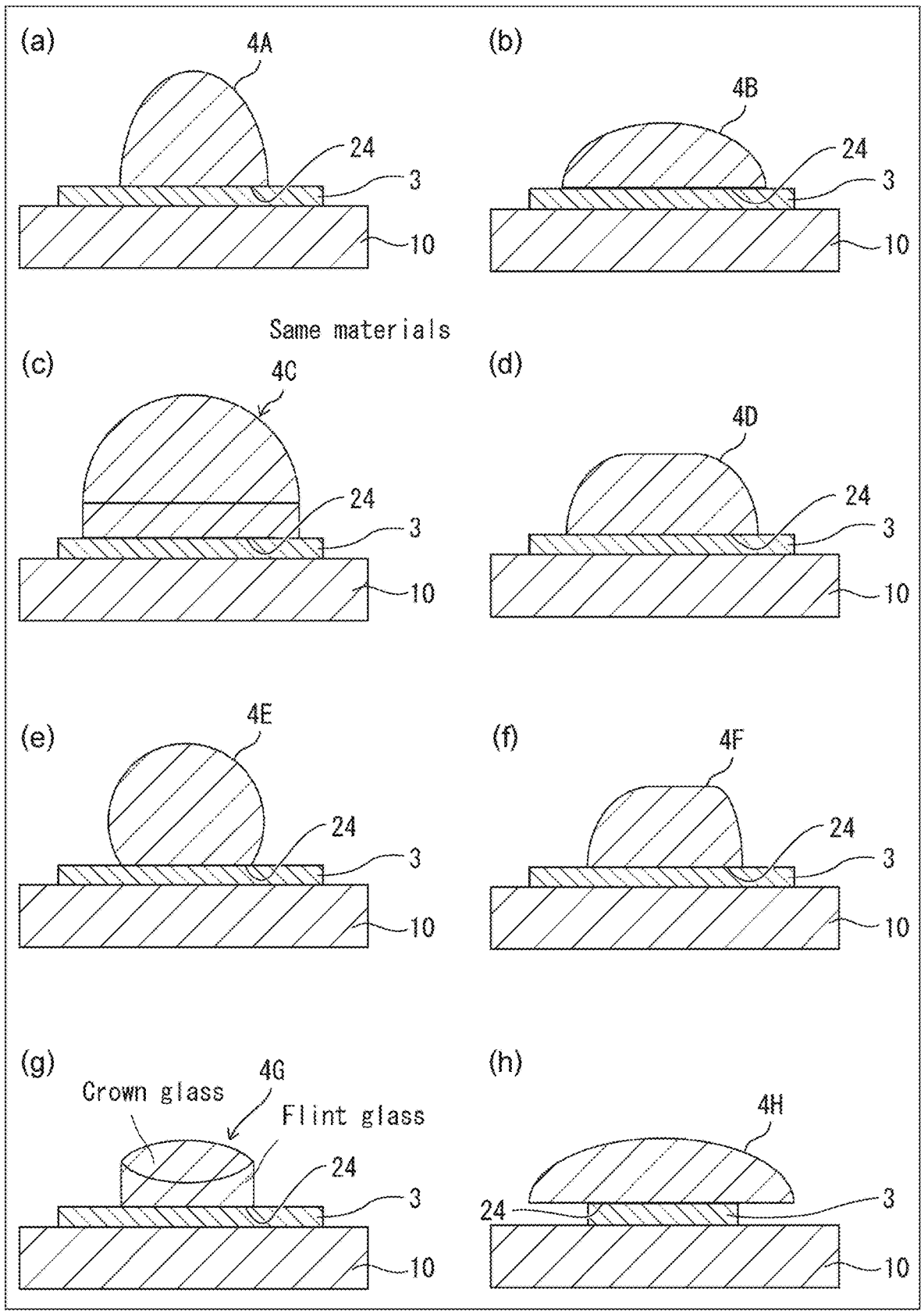
FIG. 8 is a drawing illustrating eight sectional views, including views (a) to (h) that are sectional views illustrating modified examples according to shapes of optical members of the light source unit.

The optical member 4A has a vertically long parabolic shape as illustrated in FIG. 8(a) and the optical member 4B has a depressed parabolic shape as illustrated in FIG. 8(b). The optical member 4C has a shape in which a hemispherical portion and a cylindrical portion that are made of the same material are combined. The optical members 4D and 4E have a free-form curved shape that is horizontally symmetric as illustrated in FIGS. 8(d) and (e) and the optical member 4F has a free-form curved shape that is horizontally asymmetric as illustrated in FIG. 8(f).

The optical member 4G is a lens doublet consisting of crown glass and flint glass as illustrated in FIG. 8(g) and is used to correct chromatic aberration of the converted beam CB. Ideally, the refractive indexes of the optical members 4A to 4H, by which the traveling direction of the pump beam PB is more largely changed, and the Abbe numbers of the optical members 4A to 4H to reduce chromatic aberration need to be high.

For a practical reason, it is practical that the optical member 4H is configured to be either bigger than the phosphor 3 as illustrated in FIG. 8(h) or smaller than the phosphor 3.

FIGS. 9(a) and (b) are sectional views each illustrating a modified example according to a structure of the optical member 4 of the light source unit 1. As illustrated in FIGS. 9(a) and (b), the optical member 4 may have a refractive coupling portion 13 or a diffractive coupling portion 14 that deflects the pump beam PB toward a position on the phosphor 3. The diffractive coupling portion 14 is constituted by a transmissive diffractive grating.

As illustrated in FIG. 9(a), the pump beam PB is incident on the refractive coupling portion 13 provided on the outer peripheral surface of the optical member 4, is refracted by the refractive coupling portion 13, and results in the pump beam PBX deflected toward the phosphor 3 side, and the pump beam PBX is incident on the phosphor 3. Moreover, as illustrated in FIG. 9(b), the pump beam PB is incident on the diffractive coupling portion 14 provided on the outer peripheral surface of the optical member 4, is diffracted by the diffractive coupling portion 14, and results in the pump beam PBX deflected toward the phosphor 3 side, and the pump beam PBX is incident on the phosphor 3.

Figure 10:
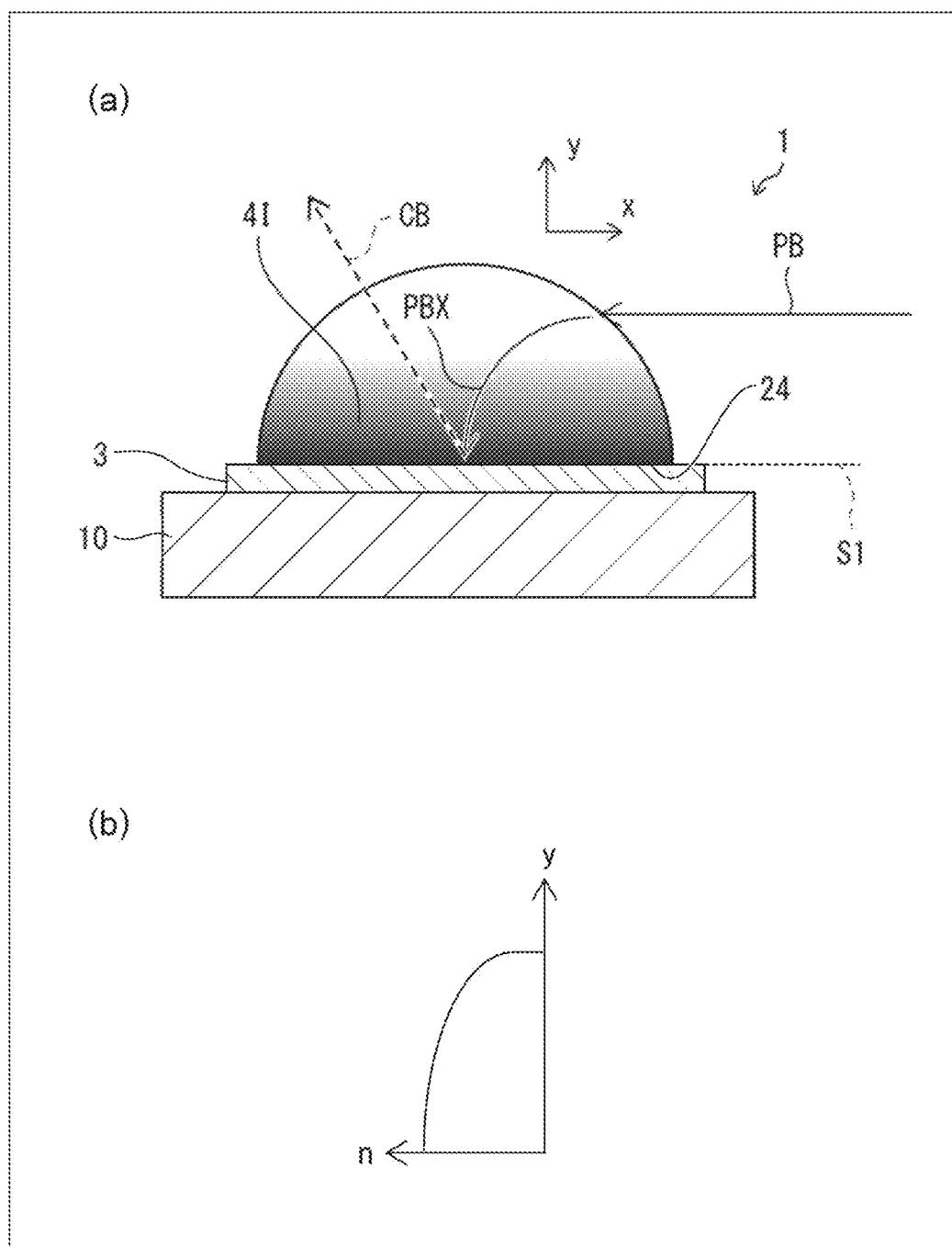
FIG. 10 is a drawing illustrating two views pertaining to a modified example, whereby (a) is a sectional view illustrating a modified example according to a characteristic of an optical member of the light source unit and (b) is a graph illustrating refractive index distribution along a y direction in the modified example of the optical member.

FIG. 10(a) is a sectional view illustrating a modified example according to a characteristic of an optical member 4I of the light source unit 1 and FIG. 10(b) is a graph illustrating refractive index distribution along a y direction in the modified example of the optical member 4I. The optical member 4I is composed of a material whose refractive index gradually varies along the y direction, and a refractive index n of the optical member 4I increases parabolically along a −y direction as illustrated in FIG. 10(b).

The pump beam PB incident on an outer peripheral surface of the optical member 4I results in the pump beam PBX and gradually changes the traveling direction toward the center of the surface of the phosphor 3 as traveling in the optical member 4I as illustrated in FIG. 10(a). In a case where the pump beam PBX is incident on the phosphor 3, the pump beam PBX is converted into the converted beam CB. An angle of incidence of the pump beam PBX onto the phosphor 3 can be between 0 degrees and 90 degrees, and preferably between 15 degrees and 65 degrees. A majority of the converted beam CB is emitted through the optical member 4I.

Figure 11:
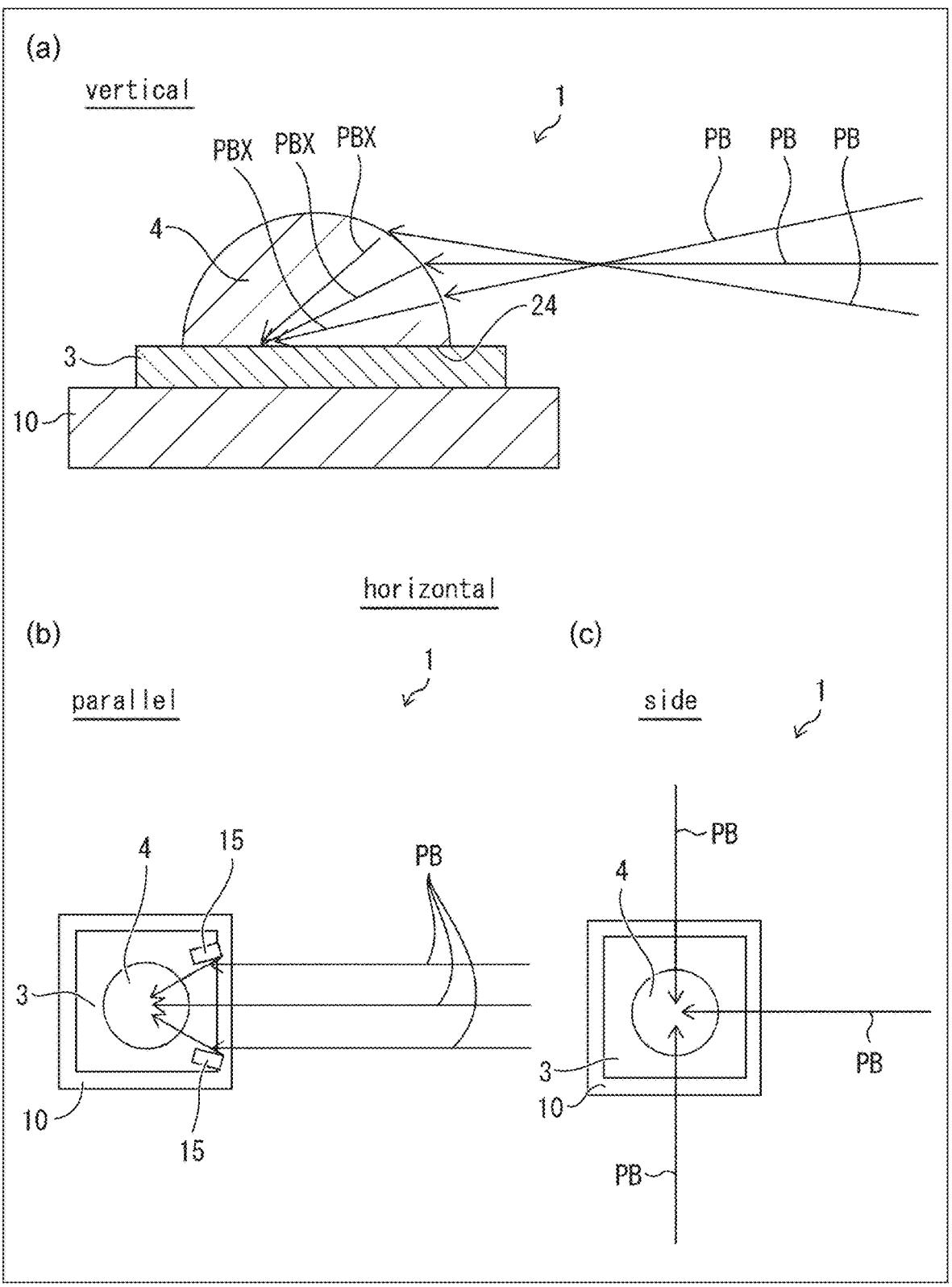
FIG. 11 is a drawing illustrating three sectional views, including views (a) to (c) that are sectional views each illustrating a modified example according to a plurality of pump beams of the light source unit.

FIGS. 11(a) to (c) are sectional views each illustrating a modified example according to a plurality of pump beams PB of the light source unit 1.

A plurality of pump beams PB coming from individual laser diodes provided in the beam producing unit 2 are aligned in a vertical direction or a horizontal direction and emitted. This configuration is different from the configuration described in FIG. 4, which relates to a single pump beam PB including the plurality of pump rays PR, in the plurality of pump beams PB.

In a case where the plurality of pump beams PB are aligned in the vertical direction, the plurality of pump beams PB arrive on different points on the outer peripheral surface of the optical member 4 having a hemispherical shape as illustrated in FIG. 11(a). Then, the plurality of pump beams PB are refracted onto a single point or multiple points on the phosphor 3.

In a case where the plurality of pump beams PB are aligned in the horizontal direction, the plurality of pump beams PB travel in parallel from one direction toward the optical member 4 and are incident on the optical member 4 as illustrated in FIG. 11(b). A pump beam PB aligned at one end among the plurality of pump beams PB is reflected by a mirror 15 arranged in front of the optical member 4, and is incident on the optical member 4. A pump beam PB aligned at the other end among the plurality of pump beams PB is reflected by another mirror 15 arranged in front of the optical member 4, and is incident on the optical member 4.

In the case where the plurality of pump beams PB are aligned in the horizontal direction, the plurality of pump beams PB may be incident on the optical member 4 from a plurality of different side directions as illustrated in FIG. 11(c).

Embodiment 2

Figure 12:
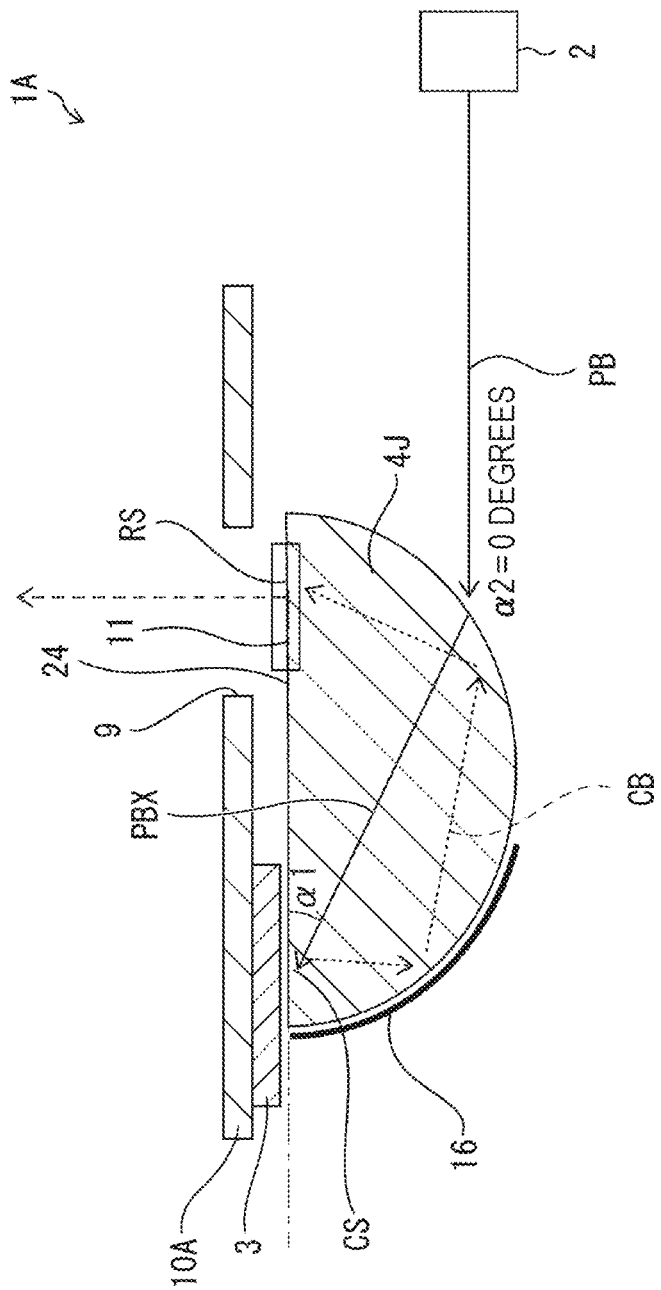
FIG. 12 is a sectional view of a light source unit according to Embodiment 2.

FIG. 12 is a sectional view of a light source unit 1A according to Embodiment 2. A member having the same function as that of the member described in the aforementioned embodiment will be given the same reference sign and description thereof will not be repeated.

The phosphor 3 is mounted on a lower surface of a substrate 10A and arranged on a side of one edge of a bottom face of an optical member 4J with a hemispherical shape. The converted beam CB converted from the pump beam PBX on a converted spot CS of the phosphor 3 is subjected to total reflection (TIR, Total Internal Reflection) by an inner peripheral surface of the optical member 4J and re-imaged at a re-imaged spot RS of an extraction portion 11 arranged on a side of the other edge of the optical member 4J. The converted beam CB re-imaged at the re-imaged spot RS of the optical member 4J is emitted through an emission hole 9 formed in the substrate 10A.

The optical member 4J on the phosphor 3 is configured so that all the converted beam CB from the converted spot CS is guided through an inside of the optical member 4J by total reflection (TIR). The converted spot CS corresponds to a shape of the pump beam PBX on the phosphor 3. When the pump beam PBX is deflected by an outer peripheral surface of the optical member 4J so that a position where the pump beam PBX is incident on the phosphor 3 is very close to the edge of the bottom face of the optical member 4J, the converted beam CB experiences total reflection (TIR) by the inner peripheral surface of the optical member 4J and is guided to the re-imaged spot RS on the side of the other edge of the bottom face of the optical member 4J, in which the converted spot CB is re-imaged. A shape and a size of the re-imaged spot RS depend on a shape of the optical member 4J. The shape of the optical member 4J is able to be designed by optical engineering and is able to have, for example, an ellipsoid shape.

The optical member 4J has the extraction portion 11, by which extraction efficiency of the converted beam CB to outside is improved, on a position of the re-imaged spot RS. The extraction portion 11 has a curved surface, a diffraction grating, or a surface having an optical structure to cause reflection, scattering, or diffraction.

Some of converted beams CB emitted at a small angle may not be reflected by total reflection (TIR) of the optical member 4J but escape to outside through the optical member 4J. In this example, a reflective film 16 is arranged on the outer peripheral surface of the optical member 4J and reflects the converted beam CB so that the escaping converted beam CB returns toward the phosphor 3. Though the phosphor 3 may be, for example, YAG:Ce, the phosphor 3 commonly has scattering properties, and the converted beam CB reflected by the reflective film 16 and returned toward the phosphor 3 is scattered again by the phosphor 3 and recycled.

According to the aforementioned configuration, a spot size ratio of the re-imaged spot RS to the converted spot CS is able to be changed by adjusting the shape of the optical member 4J.

Figure 13:
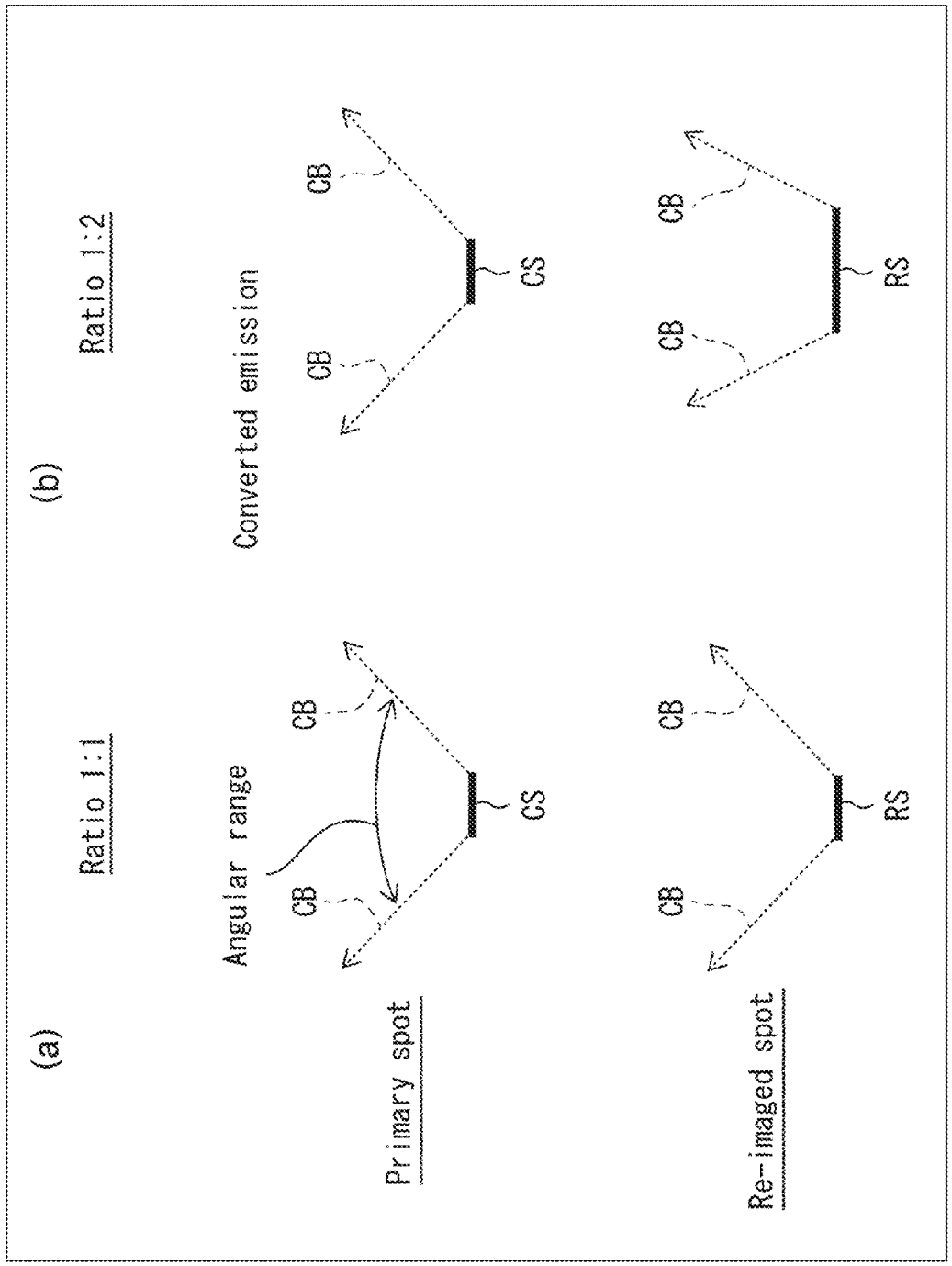
FIG. 13 is a drawing illustrating two angular range operations, including ranges (a) and (b) that each illustrate angular range of converted beams emitted from a converted spot and a re-imaged spot of the light source unit.

FIGS. 13(a) and (b) illustrate angles of emission of converted beams CB emitted from the converted spot CS and the re-imaged spot RS of the light source unit 1A. FIG. 13(a) illustrates angles of emission at which the converted beams CB are emitted from the converted spot CS and the re-imaged spot RS when the spot size ratio of the re-imaged spot RS to the converted spot CS is 1:1 and FIG. 13(b) illustrates angles of emission when the spot size ratio is 1:2.

An angular range of the converted beam CB emitted from the phosphor 3 is typically based on Lambertian distribution. When the spot size ratio of the re-imaged spot RS to the converted spot CS is increased, for example, from 1:1 illustrated in FIGS. 13(a) to 1:2 illustrated in FIG. 13(b), that is, when the re-imaged spot RS is twice a size of the converted spot CS, an angular range of the converted beam CB emitted from the re-imaged spot RS is narrower as illustrated in FIGS. 13(a) and (b) because etendue is maintained.

According to the aforementioned configuration, when the light source unit 1A according to Embodiment 2 illustrated in FIG. 12 is used with the reflector 8, much more converted beam CB is reflected by the reflector 8, and therefore system efficiency is improved.

Example 1

Figure 14:
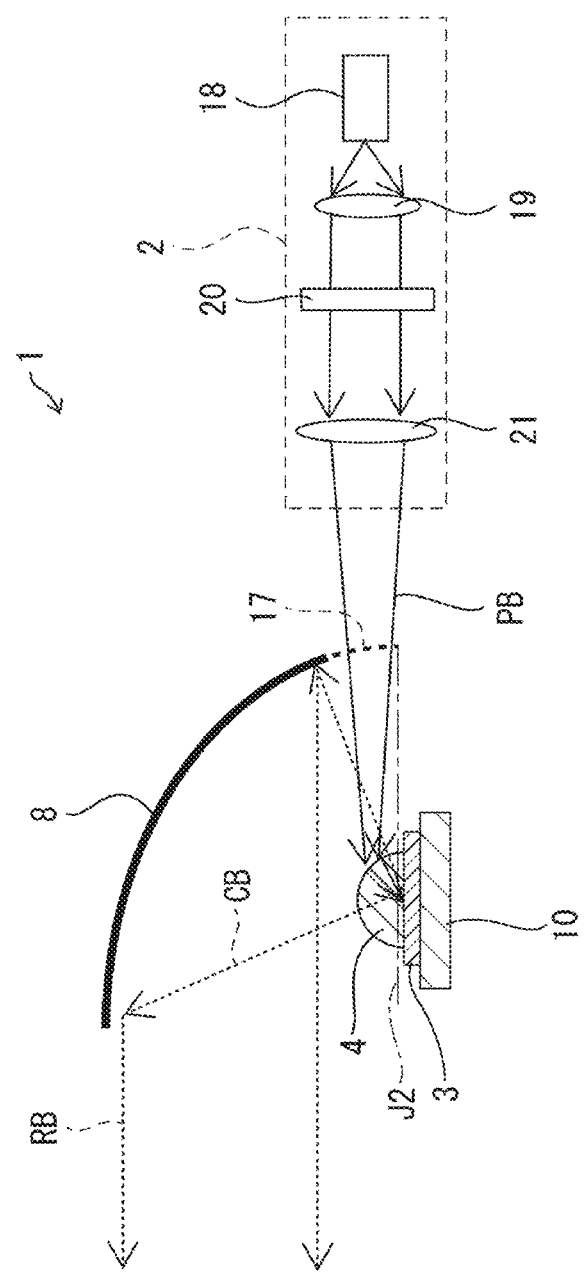
FIG. 14 is a schematic view of a light source unit according to Example 1.

FIG. 14 is a schematic view of the light source unit 1 according to Example 1. A member having the same function as that of the member described in the aforementioned embodiments will be given the same reference sign and description thereof will not be repeated.

The light source unit 1 including the beam producing unit 2, the phosphor 3, the optical member 4, and the reflector 8 as illustrated in FIG. 14 is able to be used for an automobile headlight. The phosphor 3 is made of YAG:Ce and mounted on the substrate 10 made of highly-reflective metal. Thereby, the system operates in a reflective phosphor configuration.

The beam producing unit 2 includes a laser source 18 emitting the pump beam PB. The laser source 18 is semiconductor laser in a CAN type or semiconductor laser as a chip and has a wavelength of 450 nm, for example.

The beam producing unit 2 further includes a collimation lens 19, a homogenizer 20 to obtain flat-top distribution of the pump beam PB, and a focusing lens 21 creating the converted beam CB. Alternatively, a position of the collimation lens 19 may be adjusted to create the converted beam CB without need for the focusing lens 21.

The laser source 18 emits the pump beam PB with a wavelength around 450 nm, and the pump beam PB is collimated by the collimation lens 19 and homogenized by the homogenizer 20, and the pump beam PB is focused by the focusing lens 21 so that a position of the phosphor 3 is matched with a focal point of the reflector 8. The converged pump beam PB is coupled into the optical member 4 and deflected toward the center of the phosphor 3. A position of the focusing lens 21 is adjusted so that a focus spot of the converged pump beam PB is on the phosphor 3. The pump beam PB hits the surface of the phosphor 3 at the center of the bottom face of the optical member 4, is converted into the converted beam CB resulting in white light, and emitted from the phosphor 3 through the optical member 4 toward the reflector 8. The reflector 8 has a parabolic shape which collimates the converted beam CB, and projects the projection beam RB obtained by changing the traveling direction of the converted beam CB toward a forward direction (left direction in FIG. 14).

Example 2

FIGS. 15(*a*) and (*b*) are sectional views for explaining the light source unit 1 according to Example 2. FIG. 16 is a schematic view of the light source unit 1. A member having the same function as that of the member described above will be given the same reference sign and description thereof will not be repeated.

Though the light source unit 1 according to Example 2 is substantially similar to the light source unit 1 described in Example 1, the pump beam PBX hits a position apart from the center of the surface of the phosphor 3 as illustrated in FIG. 15(*b*) in Example 2. In this case, the converted beam CB changes a traveling direction when passing through the optical member 4. On the other hand, in a case where the pump beam PB hits the center of the surface of the phosphor 3, the converted beam CB does not change the traveling direction when passing through the optical member 4, as illustrated in FIG. 15(*a*).

According to a configuration illustrated in FIG. 15(*b*), when used together with the reflector 8, it is possible to improve reflection efficiency of the reflector 8 because the converted beam CB has the traveling direction redirected toward the reflector 8 as illustrated in FIG. 16 when passing through the optical member 4.

A principle that the converted beam CB directed to the reflector 8 from the phosphor 3 through the optical member 4 is deflected in the traveling direction as illustrated in FIGS. 15(*b*) and 16 is similar to a principle disclosed in Embodiment 1.

Example 3

Figure 17:
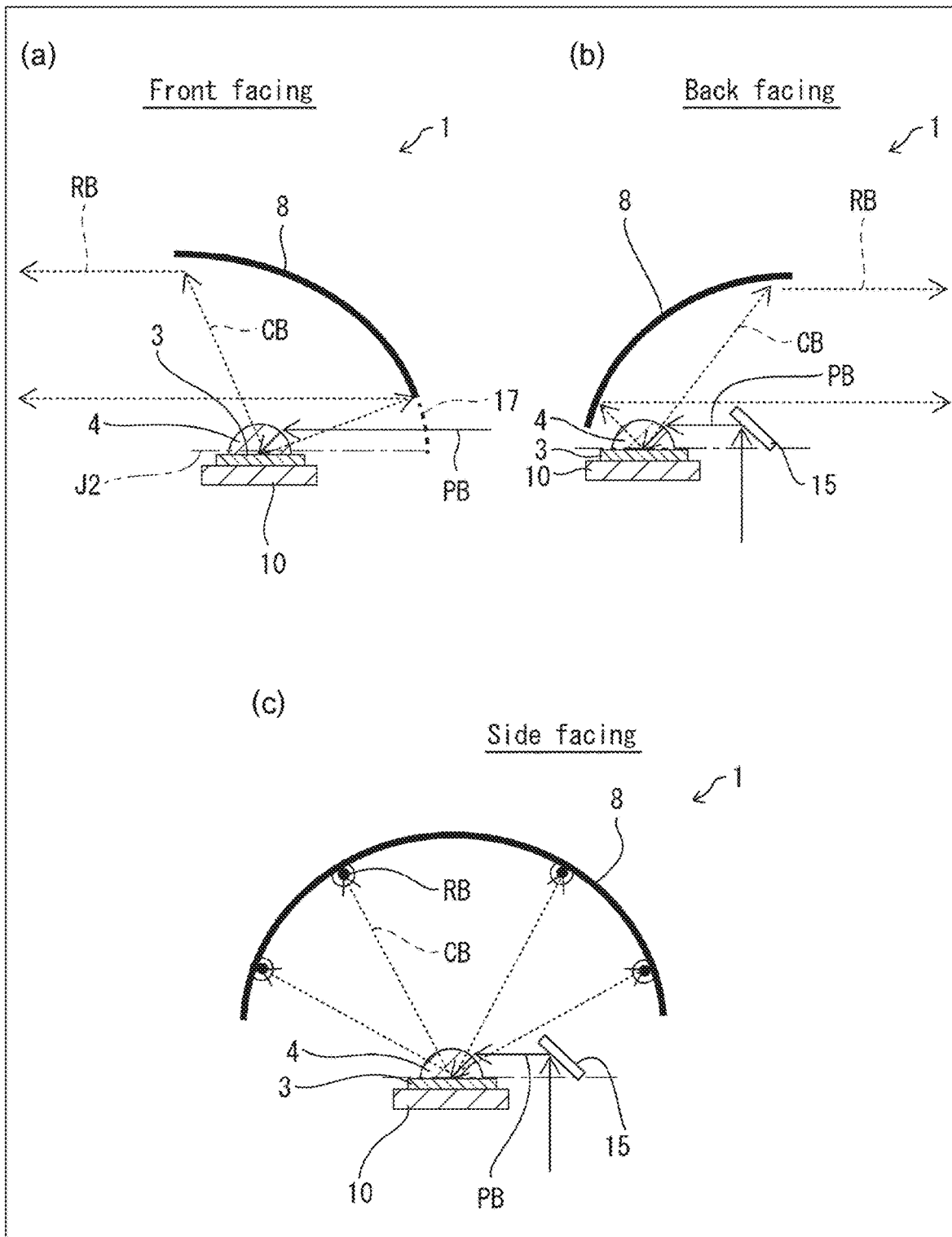
FIG. 17 is a drawing illustrating three schematic views, including views (a), (b), and (c) that are schematic views of a light source unit according to Example 3.

FIGS. 17(*a*), (*b*), and (*c*) are schematic views of the light source unit 1 according to Example 3. A member having the same function as that of the member described above will be given the same reference sign and description thereof will not be repeated.

Though the light source unit 1 according to Example 3 is substantially similar to the light source unit 1 described in Example 1, a direction in which the pump beam PB is incident on the optical member 4 and a direction of the projection beam RB emitted from the reflector 8 are different directions depending on an installation form of the reflector 8 in Example 3. In an example illustrated in FIG. 17(*a*), the pump beam PB incident on the optical member 4 and the projection beam RB emitted from the reflector 8 propagate in the same direction. In an example illustrated in FIG. 17(*b*), the pump beam PB incident on the optical member 4 and the projection beam RB emitted from the reflector 8 propagate in directions opposite to each other. In an example illustrated in FIG. 17(*c*), the pump beam PB and the projection beam RB propagate in directions orthogonal to each other.

Example 4

Figure 18:
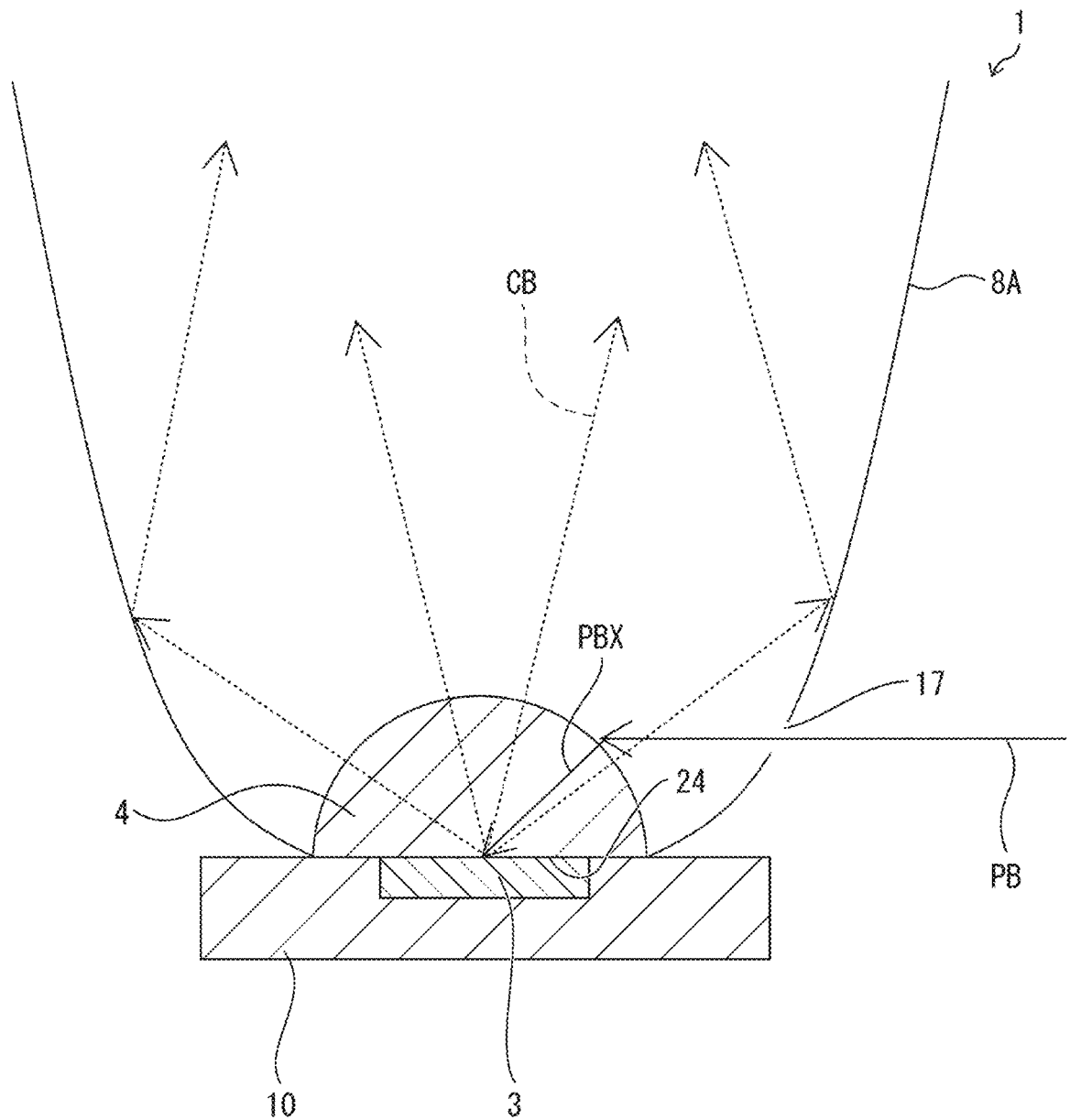
FIG. 18 is a sectional view of a light source unit according to Example 4.

FIG. 18 is a sectional view of the light source unit 1 according to Example 4. A member having the same function as that of the member described above will be given the same reference sign and description thereof will not be repeated.

In Example 4, a reflector 8A having a revolution paraboloid of a full parabolic type is used. The phosphor 3 is mounted on the substrate 10 made of highly-reflective metal. Therefore, the system operates in a reflective phosphor configuration.

A small gap 17 allowing the pump beam PB to pass therethrough is formed in the reflector 8A. The pump beam PB passing through the gap 17 is incident on the optical member 4 and deflected toward the center of the phosphor 3. The pump beam PBX incident on the phosphor 3 scatters and the converted beam CB resulting in white light is produced. The converted beam CB emitted from the phosphor 3 is directed to the reflector 8A through the optical member 4. The reflector 8A is of the full parabolic type which reflects and collimates almost all the converted beam CB and redirects the traveling direction of the converted beam CB toward an upward direction illustrated in FIG. 18. The light source unit 1 including the reflector 8A of the full parabolic type is able to be used for high power indoor and outdoor lighting to produce a narrow light beam.

Example 5

Figure 19:
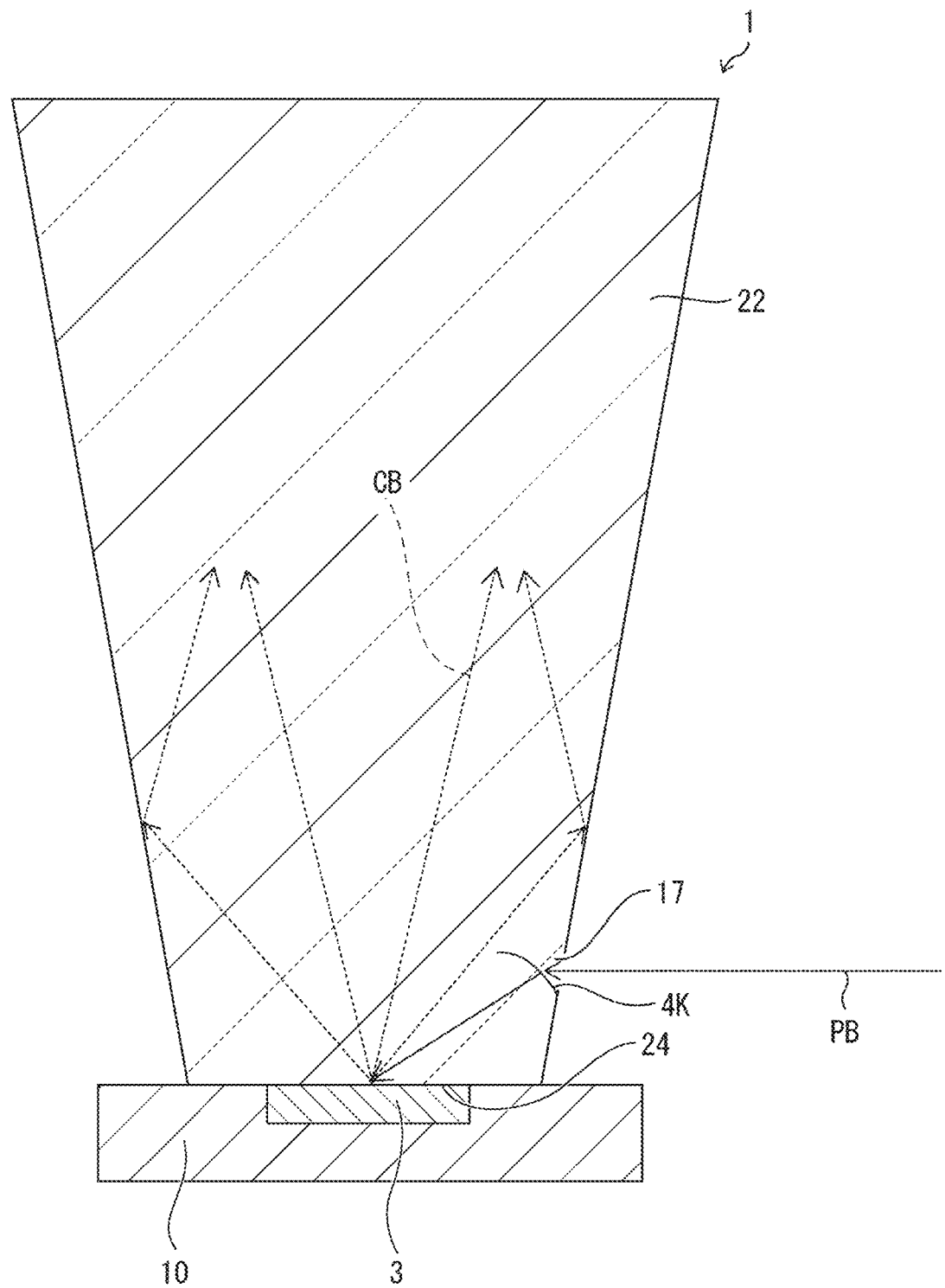
FIG. 19 is a sectional view of a light source unit according to Example 5.
Figure 20:
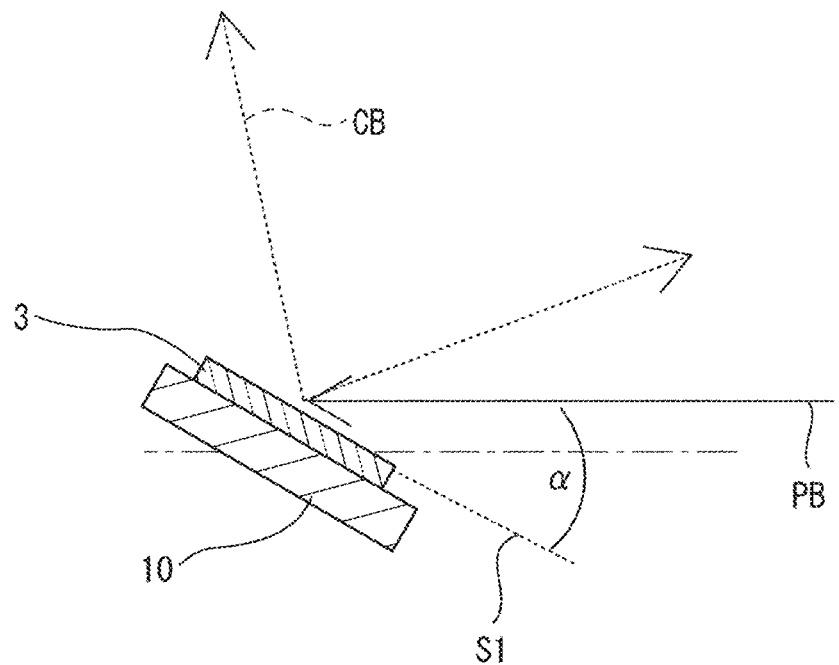
FIG. 20 is a sectional view of a conventional light source unit.

FIG. 19 is a sectional view of the light source unit 1 according to Example 5. A member having the same function as that of the member described above will be given the same reference sign and description thereof will not be repeated.

In Example 5, a compound parabolic concentrator (CPC) 22 is used. The phosphor 3 is mounted on the substrate 10 made of highly-reflective metal. Therefore, the system operates in a reflective phosphor configuration.

The compound parabolic concentrator 22 is arranged on the substrate 10 so as to cover the phosphor 3 to control the converted beam CB emitted from the phosphor 3. The small gap 17 where an optical member 4K is inserted is formed in the compound parabolic concentrator 22. The pump beam PB passes through the gap 17 and is incident on the inserted optical member 4K. Then, the pump beam PB is refracted by the optical member 4K toward the center of the phosphor 3 and travels in the compound parabolic concentrator 22.

The compound parabolic concentrator 22 is able to be made of a transparent solid material such as glass (BAF10, LAH79, or sapphire). The optical member 4K is able to be made of the same material as that of the compound parabolic concentrator 22 to avoid refractive index contrast, or to be made of a different material, such as N-BK7, which has a different refractive index from that of the compound parabolic concentrator 22 and has a refractive index contrast in the compound parabolic concentrator 22 to further deflect the pump beam PB toward the phosphor 3.

The optical member 4K is able to have a shape and a position different from those of the optical member indicated in Embodiment 1. For example, the optical member 4K can be a vertical cut of the compound parabolic concentrator 22 with a right inclination to refract or diffract the pump beam PB toward the phosphor 3.

When hitting the phosphor 3, the pump beam PB is converted into the converted beam CB which is white light, and emitted from the phosphor 3 to the compound parabolic concentrator 22. In this configuration, almost all the converted beam CB is collected and guided through the compound parabolic concentrator 22.

CONCLUSION

A light source unit 1 according to an aspect 1 of the invention includes: a light source (beam producing unit 2) that emits a pump beam PB; a phosphor 3 that converts the pump beam PB, which is emitted from the light source (beam producing unit 2), into a converted beam CB; and an optical member 4 that is arranged near the phosphor 3 to deflect the pump beam PB, in which the optical member 4 deflects the pump beam PB so that a first angle of incidence $\alpha 1$ of the pump beam PB, which is deflected by the optical member 4, relative to a surface of the phosphor 3 is larger than a second angle of incidence $\alpha 2$ of the pump beam PB, which is incident on the optical member 4, relative to the surface of the phosphor 3, and the optical member 4 has a counterface surface 24 that faces the phosphor 3 so as to cover the surface of the phosphor 3.

According to the aforementioned configuration, the pump beam is able to be incident on the optical member at the second angle of incidence smaller than the first angle of incidence of the pump beam, which is deflected by the optical member, relative to the surface of the phosphor. Therefore, use efficiency of the converted beam in a reflector that reflects the converted beam, which is converted from the pump beam by the phosphor, and projects the resultant as a projection beam is able to be increased.

In the light source unit 1 according to an aspect 2 of the invention, the second angle of incidence $\alpha 2$ may be equal to or less than 40 degrees, in the aspect 1.

According to the aforementioned configuration, use efficiency of the converted beam in the reflector that reflects the converted beam, which is converted from the pump beam by the phosphor, and projects the resultant as the projection beam is able to be further increased.

In the light source unit 1 according to an aspect 3 of the invention, the pump beam PB deflected at an incident surface of the optical member 4 may travel in the optical member 4 and be incident on the phosphor 3, in the aspect 1.

According to the aforementioned configuration, the optical member is able to be arranged on the surface of the phosphor.

In the light source unit 1 according to an aspect 4 of the invention, the optical member 4 may refract or diffract the pump beam PB, in the aspect 1.

According to the aforementioned configuration, the pump beam is able to be deflected toward a side of the phosphor in a traveling direction.

In the light source unit 1 according to an aspect 5 of the invention, the optical member 4 may be bonded to the phosphor 3, an intermediate layer may be arranged between the optical member 4 and the phosphor 3, or an air gap may be formed between the optical member 4 and the phosphor 3, in the aspect 1.

According to the aforementioned configuration, the optical member is able to be easily arranged at a position corresponding to the phosphor.

In the light source unit 1 according to an aspect 6 of the invention, an anti-reflective coating 7 may be formed on the optical member 4, in the aspect 1.

According to the aforementioned configuration, the pump beam incident on the optical member is able to be prevented from being reflected by the optical member.

The light source unit 1 according to an aspect 7 of the invention may further include a reflector 8 that projects a projection beam RB obtained by collimating the converted beam CB from the phosphor 3, in which a direction in which the pump beam PB is incident on the optical member 4 and a direction in which the projection beam RB is projected may be identical, opposite, or orthogonal directions, in the aspect 1.

According to the aforementioned configuration, by an arrangement form of the reflector in the direction in which the pump beam is incident on the optical member, freedom in setting related to the direction in which the projection beam is projected is increased.

In the light source unit 1 according to an aspect 8 of the invention, the pump beam PB may include a plurality of different pump rays PR, and a traveling direction correction member (correction member 4A, 4B, 4C) that corrects traveling directions of the plurality of different pump rays PR so that the plurality of different pump rays PR are incident to converge onto an identical point on the phosphor 3 may be further provided, in the aspect 1.

According to the aforementioned configuration, the pump rays incident on different curvatures of a surface of the optical member are able to be converged onto the same point on the phosphor.

A light source unit 1A according to an aspect 9 of the invention includes: a light source (beam producing unit 2) that emits a pump beam PB; a phosphor 3 that is mounted on a substrate 10A to convert the pump beam PB, which is emitted from the light source (beam producing unit 2), into a converted beam CB; and an optical member 4J that is arranged at a position corresponding to the phosphor 3 to deflect the pump beam PB at an incident surface on which the pump beam PB is incident, in which the optical member 4J deflects the pump beam PB so that a first angle of incidence $\alpha 1$ of the pump beam PB, which is deflected by the optical member 4J, relative to a surface of the phosphor 3 is larger than a second angle of incidence $\alpha 2$ of the pump beam PB, which is incident on the optical member 4J, relative to the surface of the phosphor 3, the phosphor 3 is arranged on a side of one edge of the optical member 4J, the converted beam CB converted by the phosphor 3 is reflected by an inner surface of the optical member 4J and re-imaged on a side of another edge of the optical member 4J, and the converted beam CB that is re-imaged on the side of the other edge of the optical member 4J is emitted.

According to the aforementioned configuration, a light-emitting spot of the pump beam, which is deflected by the optical member, on the surface of the phosphor is able to be re-imaged with any size on the side of the other edge, so that a parabolic angle from the spot that is re-imaged is able to be controlled. In particular, the parabolic angle that is small is effective and makes it possible to increase use efficiency of the converted beam in the reflector that reflects the converted beam, which is converted from the pump beam by the phosphor, and projects the resultant as the projection beam. Then, the converted beam converted from the pump beam by the phosphor is able to be emitted toward a side opposite to the phosphor relative to the substrate.

In the light source unit 1A according to an aspect 10 of the invention, the second angle of incidence $\alpha 2$ may be equal to or less than 40 degrees, in the aspect 9.

According to the aforementioned configuration, use efficiency of the converted beam in the reflector that reflects the converted beam, which is converted from the pump beam by the phosphor, and projects the resultant as a projection beam is able to be further increased.

In the light source unit 1A according to an aspect 11 of the invention, the pump beam PB deflected at the incident surface of the optical member 4J may travel in the optical member 4J and be incident on the phosphor 3, in the aspect 9.

According to the aforementioned configuration, the optical member is able to be arranged on the surface of the phosphor.

In the light source unit 1A according to an aspect 12 of the invention, the optical member 4J may refract or diffract the pump beam PB and deflect the pump beam PB toward a side of the phosphor 3 in a traveling direction, in the aspect 9.

According to the aforementioned configuration, the pump beam is able to be deflected toward the side of the phosphor in the traveling direction.

In the light source unit 1A according to an aspect 13 of the invention, the optical member 4J may be bonded to the phosphor 3, an intermediate layer may be arranged between the optical member 4J and the phosphor 3, or an air gap may be formed between the optical member 4J and the phosphor 3, in the aspect 9.

According to the aforementioned configuration, the optical member is able to be easily arranged at the position corresponding to the phosphor.

In the light source unit 1A according to an aspect 14 of the invention, an anti-reflective coating 7 may be formed on the optical member 4J, in the aspect 9.

According to the aforementioned configuration, the pump beam incident on the optical member is able to be prevented from being reflected by the optical member.

The light source unit 1A according to an aspect 15 of the invention may further include a reflector 8 that projects a projection beam RB obtained by collimating the converted beam CB that is emitted through an emission hole 9 formed in the substrate 10A, in which a direction in which the pump beam PB is incident on the optical member 4J and a direction in which the projection beam RB is projected may be identical, opposite, or orthogonal directions, in the aspect 9.

According to the aforementioned configuration, by an arrangement form of the reflector in the direction in which the pump beam is incident on the optical member, freedom in setting related to the direction in which the projection beam is projected is increased.

In the light source unit 1A according to an aspect 16 of the invention, the optical member 4J may have an extraction portion 11 arranged on the side of the other edge of the optical member 4J to improve extraction efficiency of the converted beam CB, in the aspect 9.

According to the aforementioned configuration, extraction efficiency of the converted beam is improved, so that use efficiency of the converted beam in the reflector that reflects the converted beam and projects the resultant as the projection beam is able to be further increased.

The light source unit 1A according to an aspect 17 of the invention may further include a reflector 8 that projects a projection beam RB obtained by collimating the converted beam CB that is emitted through an emission hole 9 formed in the substrate 10A, in the aspect 9.

According to the aforementioned configuration, by an arrangement form of the reflector in a direction in which the pump beam is incident on the optical member, the projection beam is able to be projected toward a necessary direction.

In the light source unit 1A according to an aspect 18 of the invention, a size ratio of a converted spot CS on the side of the one edge of the optical member 4J, at which the pump beam PB is converted into the converted beam CB by the phosphor 3, to a re-imaged spot RS on the side of the other edge of the optical member 4J, at which the converted beam CB is re-imaged, may be decided in accordance with a shape of the optical member 4J, in the aspect 9.

According to the aforementioned configuration, by deciding the size ratio in accordance with the shape of the optical member so that an angular range of the converted beam emitted from the re-imaged spot is narrow, much more converted beams CB are collected by the reflector and system efficiency is improved.

The invention is not limited to each of embodiments described above and may be modified in various manners within the scope of the claims and an embodiment achieved by appropriately combining technical means disclosed in each of different embodiments is also encompassed in the technical scope of the invention. Further, by combining the technical means disclosed in each of the embodiments, a new technical feature may be formed.

REFERENCE SIGNS LIST 1 light source unit
2 beam producing unit (light source)
3 phosphor
4 optical member
5 intermediate layer
6 air gap
7 anti-reflective coating
8 reflector
9 emission hole
10 substrate
11 extraction portion
12 out coupling portion
23A, 23B, 23C correction member (traveling direction correction member)
24 counterface surface
PB pump beam
PR pump ray
CB converted beam
RB projection beam
$\alpha 1$ first angle of incidence
$\alpha 2$ second angle of incidence
CS converted spot
RS re-imaged spot

The invention claimed is:
1. A light source unit comprising:
a light source that emits a pump beam;
a phosphor that converts the pump beam, which is emitted from the light source, into a converted beam; and
an optical member that is arranged near the phosphor to deflect the pump beam, wherein the optical member deflects the pump beam so that a first angle of incidence of the pump beam, which is deflected by the optical member, relative to a surface of the phosphor is larger than a second angle of incidence of the pump beam, which is incident on the optical member, relative to the surface of the phosphor, the optical member has a counterface surface that faces the phosphor so as to cover the surface of the phosphor, and the optical member is bonded to the phosphor, an intermediate layer is arranged between the optical member and the phosphor, or an air gap is formed between the optical member and the phosphor.

2. The light source unit according to claim 1, wherein the second angle of incidence is equal to or less than 40 degrees.

3. The light source unit according to claim 1, wherein the pump beam deflected at an incident surface of the optical member travels in the optical member and is incident on the phosphor.

4. The light source unit according to claim 1, wherein the optical member refracts or diffracts the pump beam.

5. The light source unit according to claim 1, wherein an anti-reflective coating is formed on the optical member.

6. The light source unit according to claim 1, wherein
the pump beam includes a plurality of different pump rays, and
a traveling direction correction member that corrects traveling directions of the plurality of different pump rays so that the plurality of different pump rays are incident to converge onto an identical point on the phosphor is further provided.

7. A light source unit comprising:
a light source that emits a pump beam;
a phosphor that is mounted on a substrate to convert the pump beam, which is emitted from the light source, into a converted beam; and
an optical member that is arranged at a position corresponding to the phosphor to deflect the pump beam at an incident surface on which the pump beam is incident, wherein
the optical member deflects the pump beam so that a first angle of incidence of the pump beam, which is deflected by the optical member, relative to a surface of the phosphor is larger than a second angle of incidence of the pump beam, which is incident on the optical member, relative to the surface of the phosphor,
the phosphor is arranged on a side of one edge of the optical member,
the converted beam converted by the phosphor is reflected by an inner surface of the optical member and re-imaged on a side of another edge of the optical member,
the converted beam that is re-imaged on the side of the other edge of the optical member is emitted, and
the optical member is bonded to the phosphor, an intermediate layer is arranged between the optical member and the phosphor, or an air gap is formed between the optical member and the phosphor.

8. The light source unit according to claim 7, wherein the second angle of incidence is equal to or less than 40 degrees.

9. The light source unit according to claim 7, wherein the pump beam deflected at the incident surface of the optical member travels in the optical member and is incident on the phosphor.

10. The light source unit according to claim 7, wherein the optical member refracts or diffracts the pump beam and deflects the pump beam toward a side of the phosphor in a traveling direction.

11. The light source unit according to claim 7, wherein an anti-reflective coating is formed on the optical member.

12. The light source unit according to claim 7, further comprising
a reflector that projects a projection beam obtained by collimating the converted beam that is emitted through an emission hole formed in the substrate, wherein
a direction in which the pump beam is incident on the optical member and a direction in which the projection beam is projected are identical, opposite, or orthogonal directions.

13. The light source unit according to claim 7, wherein the optical member has an extraction portion arranged on the side of the other edge of the optical member to improve extraction efficiency of the converted beam.

14. The light source unit according to claim 7, further comprising a reflector that projects a projection beam obtained by collimating the converted beam that is emitted through an emission hole formed in the substrate.

15. The light source unit according to claim 7, wherein a size ratio of a converted spot on the side of the one edge of the optical member, at which the pump beam is converted into the converted beam by the phosphor, to a re-imaged spot on the side of the other edge of the optical member, at which the converted beam is re-imaged, is decided in accordance with a shape of the optical member.

16. A light source unit comprising:
a light source that emits a pump beam;
a phosphor that converts the pump beam, which is emitted from the light source, into a converted beam; and
an optical member that is arranged near the phosphor to deflect the pump beam, wherein
the optical member deflects the pump beam so that a first angle of incidence of the pump beam, which is deflected by the optical member, relative to a surface of the phosphor is larger than a second angle of incidence of the pump beam, which is incident on the optical member, relative to the surface of the phosphor, and
the optical member has a counterface surface that faces the phosphor so as to cover the surface of the phosphor,
the light source unit further comprising
a reflector that projects a projection beam obtained by collimating the converted beam from the phosphor, wherein
a direction in which the pump beam is incident on the optical member and a direction in which the projection beam is projected are identical, opposite, or orthogonal directions.

17. The light source unit according to claim 16, wherein the second angle of incidence is equal to or less than 40 degrees.

18. The light source unit according to claim 16, wherein the pump beam deflected at an incident surface of the optical member travels in the optical member and is incident on the phosphor.

19. The light source unit according to claim 16, wherein the optical member refracts or diffracts the pump beam.

20. The light source unit according to claim 16, wherein an anti-reflective coating is formed on the optical member.

* * * * *